(12) United States Patent
Hayakawa et al.

(10) Patent No.: US 6,246,527 B1
(45) Date of Patent: Jun. 12, 2001

(54) IMAGE DISPLAY APPARATUS

(75) Inventors: Kazuhito Hayakawa, Hachioji; Takayoshi Togino, Koganei; Hisashi Oode, Hachioji, all of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/525,755

(22) Filed: Mar. 14, 2000

Related U.S. Application Data

(62) Division of application No. 09/185,723, filed on Nov. 4, 1998, now Pat. No. 6,134,051.

(30) Foreign Application Priority Data

Nov. 6, 1997 (JP) ................................................. 9-304158
Jun. 12, 1998 (JP) ............................................... 10-164835

(51) Int. Cl.[7] .................................................. G02B 27/14
(52) U.S. Cl. ............................................................ 359/630
(58) Field of Search ........................................ 359/618, 628, 359/630, 631, 632, 633, 637, 640, 720; 345/7, 8, 9

(56) References Cited

U.S. PATENT DOCUMENTS

| | | | |
|---|---|---|---|
| 5,661,603 | 8/1997 | Hanano et al. | 359/622 |
| 5,701,202 | 12/1997 | Takahashi | 359/631 |
| 5,706,136 | 1/1998 | Okuyama et al. | 359/630 |
| 5,742,262 * | 4/1998 | Tabata et al. | 345/8 |
| 5,768,025 * | 6/1998 | Togino et al. | 359/633 |
| 5,818,641 * | 10/1998 | Takahashi | 359/629 |
| 5,917,662 | 6/1999 | Sekita | 359/724 |
| 5,995,291 * | 11/1999 | Togino | 359/631 |
| 6,018,423 * | 1/2000 | Takahashi | 359/633 |
| 6,084,715 * | 7/2000 | Aoki et al. | 359/627 |
| 6,128,136 * | 10/2000 | Togino et al. | 359/630 |

* cited by examiner

Primary Examiner—Georgia Epps
Assistant Examiner—Saeed Seyrafi
(74) Attorney, Agent, or Firm—Pillsbury Winthrop LLP

(57) ABSTRACT

An optical system for an ocular optical system or a projection optical system, in which a plurality of illuminating light sources of different colors can be placed in a side-by-side relation to each other, and which makes it possible to reduce the overall size and weight of an apparatus such as a head-mounted image display apparatus or a color film projection apparatus. The optical system has an image-forming optical system (1) that projects a real image or virtual image of an object placed in an image plane (3). The image-forming optical system (1) has an entrance pupil (5) at a position on the side of the image plane (3) remote from the image-forming optical system. An exit pupil (4) is located in a conjugate relation to the entrance pupil (5) with respect to the image-forming optical system (1). A chromatic aberration producing device (6) is provided between the entrance pupil (5) and the exit pupil (4). Even if a plurality of illuminating light sources of different colors are placed in a side-by-side relation to each other on the entrance pupil (5), rays from the different light sources can pass the exit pupil; (4), being superimposed on one another, without chromatic aberration.

24 Claims, 18 Drawing Sheets

IMAGE DISPLAY APPARATUS

This is a division of Application Ser. No. 09/185,723, filed Nov. 4, 1998, U.S. Pat. No. 6,134,051.

BACKGROUND OF THE INVENTION

1. Field of the Invention

The present invention relates to an optical system usable, for example, as an ocular optical system for a head-mounted image display apparatus or a projection optical system for a color film projection apparatus.

2. Discussion of Related Art

To display or project a color image free from uneven color by using a plurality of illuminating light sources, e.g. R (red), G (green) and B (blue), it has heretofore been necessary to combine together light from each light source provided individually by using a plurality of color filters or dichroic mirrors, undesirably resulting in a large heavy arrangement. Therefore, such an arrangement is not suitable for a head-mounted image display apparatus, for example. Furthermore, because color filters and dichroic mirrors are costly, it is impossible to supply a head-mounted image display apparatus or the like at low cost.

SUMMARY OF THE INVENTION

In view of the above-described problems with the prior art, an object of the present invention is to provide an optical system for an ocular optical system or a projection optical system, in which a plurality of illuminating light sources of different colors can be placed in a side-by-side relation to each other, and which makes it possible to reduce the overall size and weight of an apparatus such as a head-mounted image display apparatus or a color film projection apparatus.

To attain the above-described object, the present invention provides an optical system having an image-forming optical system that projects a real image or virtual image of an object placed in an image plane. The image-forming optical system has an entrance pupil at a position on the side of the image plane remote from the image-forming optical system. The optical system has an exit pupil in a conjugate relation to the entrance pupil with respect to the image-forming optical system. The optical system is characterized by having a chromatic aberration producing device between the entrance pupil and the exit pupil.

According to the present invention, a chromatic aberration producing device is provided between the entrance pupil and the exit pupil. Therefore, even if a plurality of illuminating light sources of different colors are placed in a side-by-side relation to each other on the entrance pupil, rays from the different light sources can pass the exit pupil, being superimposed on one another, without chromatic aberration. Accordingly, in the case of an ocular optical system, for example, even if the observer's pupil position deviates from the exit pupil position, it is possible to observe a clear image, which is free from chromatic aberration. Thus, the present invention provides an optical system for use as an ocular optical system or a projection optical system, which makes it possible to reduce the overall size and weight of a head-mounted image display apparatus, a color film projection apparatus, etc.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

The principle of an optical system according to the present invention, together with examples thereof, will be described below.

Figure 1:
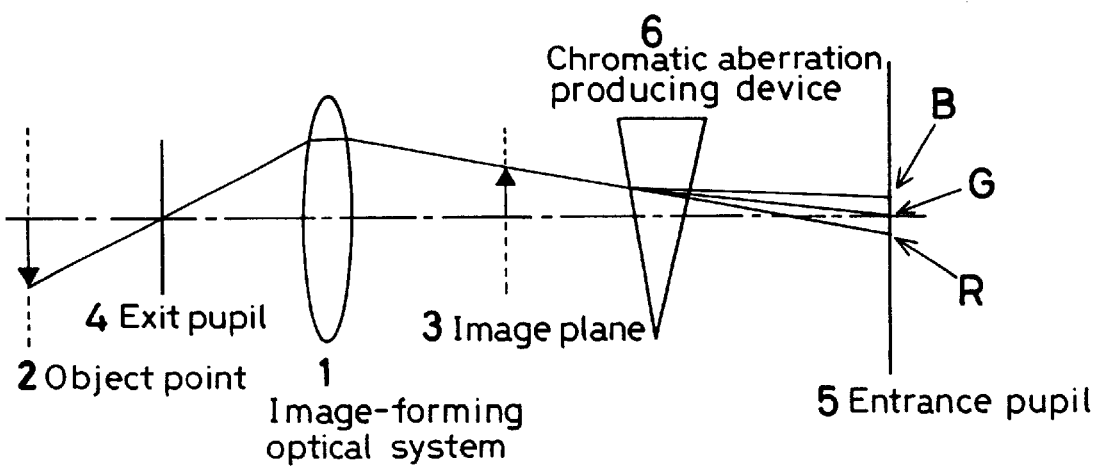
FIG. 1 is a ray path diagram showing a basic form of an optical system according to the present invention.

FIG. 1 shows a basic form of the optical system according to the present invention. The optical system according to the present invention has as a basic structure an image-forming optical system 1 that constitutes an ocular optical system or a projection optical system. With respect to the image-forming optical system 1, an object point 2 and an image plane 3 have been determined in a conjugate relation to each other. When this optical system is actually used as an ocular optical system or a projection optical system, the image plane 3 is the display plane of an image display device or the film plane, and the object point 2 is on a real image plane or a virtual image plane (in the case of a virtual image, the position of the object point 2 is on the same side as the image plane 3 with respect to the image-forming optical system 1).

Let us consider the above-described optical system by backward ray tracing in which light rays are traced from the object point 2 toward the image plane 3 (the reason for the backward ray tracing is that the optical system is assumed to be an ocular optical system). There is an exit pupil 4 in the image-forming optical system 1. The pupil 4 is an exit pupil in the forward ray tracing; it is an entrance pupil in the backward ray tracing. An entrance pupil 5 (an exit pupil in the backward ray tracing) is located at a position on the side of the image plane 3 remote from the image-forming optical system 1. The entrance pupil 5 is in a conjugate relation to the exit pupil 4. A chromatic aberration producing device 6 as shown in examples (described later) is placed between the image plane 3 and the entrance pupil 5. Consequently, light from the object point 2 that passes through the center of the exit pupil 4 passes through the image-forming optical system 1 and the image plane 3 and enters the chromatic aberration producing device 6 where chromatic aberration is introduced into the light. As a result, the light separates for each wavelength on the entrance pupil 5 as shown in FIG. 1. The chromatic aberrations on the entrance pupil 5 are those in the image of the exit pupil 4 that is projected onto the entrance pupil 5. It should be noted that FIG. 1 shows the positions of only three wavelengths R, G and B on the entrance pupil 5.

Figure 2A:
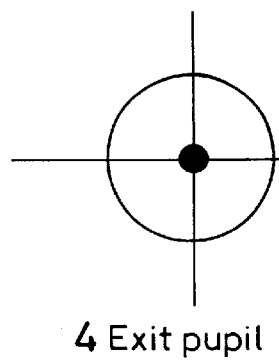
FIG. 2 is a diagram showing the relationship between images of exit and entrance pupils in FIG. 1.
Figure 2B:
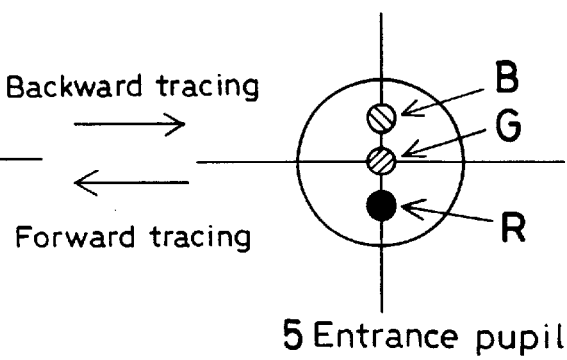

FIG. 2 is a diagram showing the relationship between images of the exit and entrance pupils 4 and 5. An image in the exit pupil 4 shown in part (a) of FIG. 2 is chromatically aberrated by the chromatic aberration producing device 6 and projected onto the entrance pupil 5 to form an image for each of the colors R, G and B as shown in part (b) of FIG. 2. If monochromatic light sources of R, G and B are placed individually on the entrance pupil 5, which is conjugate to the exit pupil 4, in alignment with the positions of chromatic aberrations in the pupil image produced in the backward ray tracing, it is possible to eliminate chromatic aberrations at the exit pupil 4 in the forward ray tracing. Accordingly, even if the observer's pupil position deviates from the exit pupil 4 in the case of an ocular optical system, for example, it is possible to observe a clear image, which is free from chromatic aberration.

The above-described arrangement makes it possible to place a plurality of illuminating light sources of different colors in a side-by-side relation to each other and hence possible to reduce the overall size and weight of a head-mounted image display apparatus or color film projection apparatus that uses the above-described optical system as an ocular optical system or a projection optical system.

Furthermore, it is only necessary to provide at least one chromatic aberration producing device 6. Therefore, the desired performance can be obtained more easily and at lower cost than in the case of the conventional optical system using a plurality of color filters or dichroic mirrors. Moreover, because the size of the structure of the whole apparatus is reduced, the overall weight of the apparatus can be reduced.

The following is a description of specific examples of the present invention. All the following Examples 1 to 6will be described on the basis of the backward ray tracing. In actuality, an image display device is placed in the image plane 3, and illuminating light sources of three colors, i.e. R, G and B, which comprise LED's or the like, are placed at the corresponding chromatic aberration points on the entrance pupil 5. In addition, a virtual image plane is located at the position of the object point 2. It should be noted that the image display device is usually a transmissive or reflective LCD (Liquid Crystal Display), a color film slide or the like.

Figure 3:
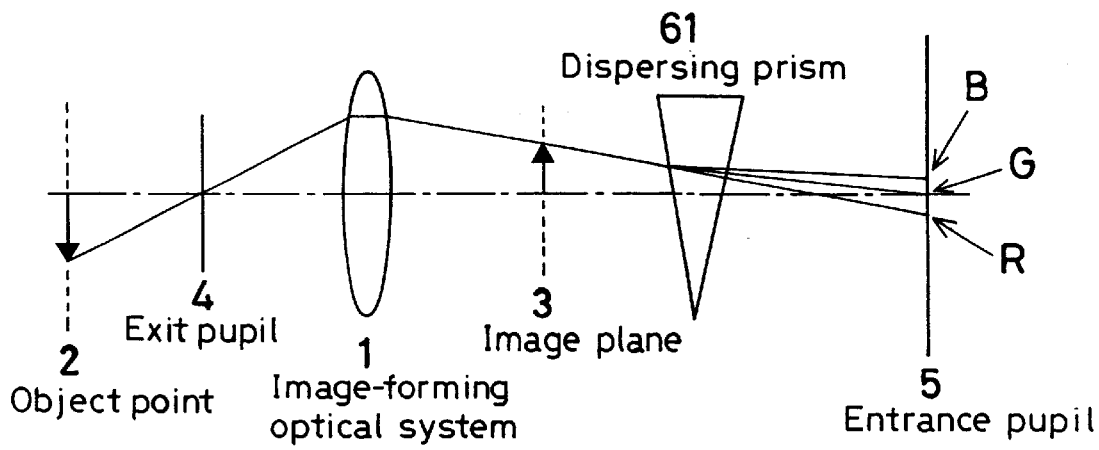
FIG. 3 is a ray path diagram showing an optical system according to Example 1 of the present invention.

FIG. 3 is a ray path diagram showing an optical system according to Example 1 of the present invention. With respect to an image-forming optical system 1, an object point 2 and an image plane 3 have been determined in a conjugate relation to each other. In addition, an exit pupil 4 and an entrance pupil 5 have been determined in a conjugate relation to each other. The entrance pupil 5 is located at a position on the side of the image plane 3 remote from the image-forming optical system 1. The image-forming optical system 1 is corrected for various aberrations, including chromatic aberration, to such an extent that the aberrations are ignorable. In this example, a dispersing prism (spectral prism) 61 having chromatic dispersion is placed between the image plane 3 and the entrance pupil 5 as a chromatic aberration producing device 6 (see FIG. 1). The optical system operates as stated in connection with FIG. 1. A plate glass having chromatic dispersion may be placed at an angle to the optical axis (shown by the chain line in the figure) in place of the dispersing prism 61. The plate glass also functions effectively as a chromatic aberration producing device 6.

Figure 4:
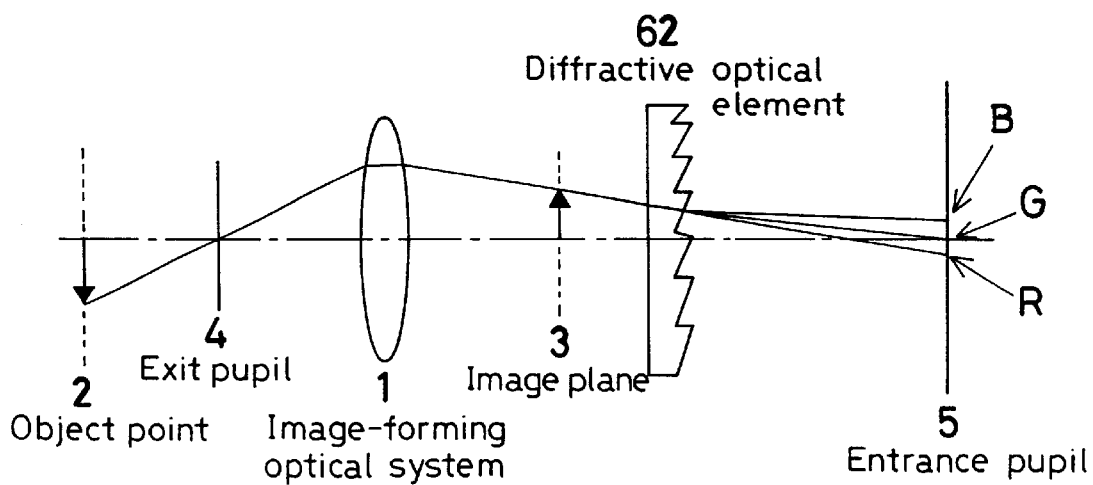
FIG. 4 is a ray path diagram showing an optical system according to Example 2 of the present invention.

FIG. 4 is a ray path diagram showing an optical system according to Example 2 of the present invention. An image-forming optical system 1, an object point 2, an image plane 3, an exit pupil 4 and an entrance pupil 5 are placed as in the case of FIG. 3. A diffractive optical element 62, e.g. a diffraction grating or a DOE, is placed between the image plane 3 and the entrance pupil 5 as a chromatic aberration producing device 6 (see FIG. 1). The optical system operates as stated in connection with FIG. 1.

Figure 5:
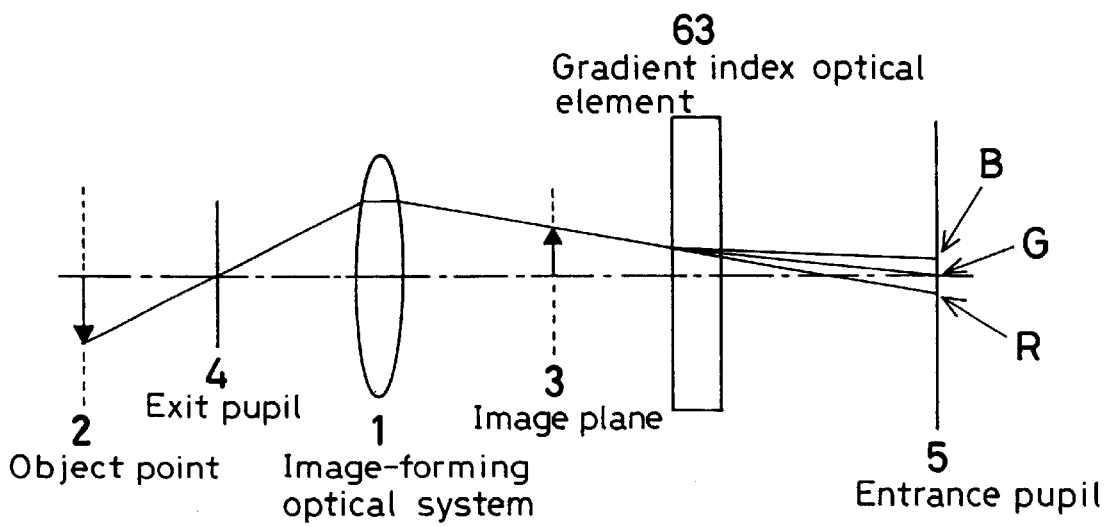
FIG. 5 is a ray path diagram showing an optical system according to Example 3 of the present invention.

FIG. 5 is a ray path diagram showing an optical system according to Example 3 of the present invention. An image-forming optical system 1, an object point 2, an image plane 3, an exit pupil 4 and an entrance pupil 5 are placed as in the case of FIG. 3. A gradient index optical element 63 having chromatic dispersion is placed between the image plane 3 and the entrance pupil 5 as a chromatic aberration producing device 6 (see FIG. 1). The optical system operates as stated in connection with FIG. 1.

Figure 6:
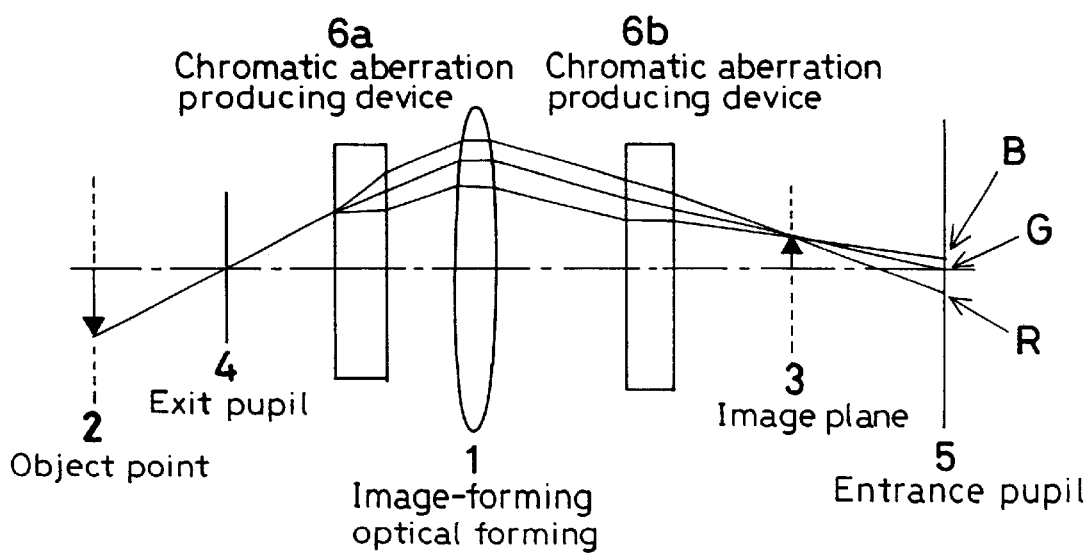
FIG. 6 is a ray path diagram showing an optical system according to Example 4 of the present invention.

FIG. 6 is a ray-path diagram showing an optical system according to Example 4 of the present invention. An image-forming optical system 1, an object point 2, an image plane 3, an exit pupil 4 and an entrance pupil 5 are placed as in the case of FIG. 3. In this example, the optical system uses two chromatic aberration producing devices 6a and 6b such as those shown in Examples 1 to 3, i.e. the dispersing prism 61, the diffractive optical element 62 and the gradient index optical element 63. The chromatic aberration producing devices 6a and 6b are placed not between the image plane 3 and the entrance pupil 5 but somewhere between the exit pupil 4 and the image plane 3 (in the case of FIG. 6, one chromatic aberration producing device 6a is placed between the exit pupil 4 and the image-forming optical system 1, and the other chromatic aberration producing device 6b between the image-forming optical system 1 and the image plane 3). Light from the object point 2 that passes through the center of the exit pupil 4 passes through the chromatic aberration producing device 6a where chromatic aberration is introduced into the light. Then, the light passes through the image-forming optical system 1 and enters the other chromatic aberration producing device 6b, which compensates for the chromatic aberration such that the light has no chromatic aberration on the image plane 3. However, chromatic aberration is produced again at the position of the entrance pupil 5. Consequently, the light separates for each wavelength on the entrance pupil 5 as shown in FIG. 6. The chromatic aberrations on the entrance pupil 5 are those in the image of the exit pupil 4 that is projected onto the entrance pupil 5. If monochromatic light sources of R, G and B are placed individually on the entrance pupil 5 in alignment with the positions of chromatic aberrations in the pupil image produced in the backward ray tracing, it is possible to eliminate chromatic aberrations at the exit pupil 4 in the forward ray tracing. Accordingly, in this example also, even if the observer's pupil position deviates from the exit pupil 4 in the case of an ocular optical system, for example, it is possible to observe a clear image, which is free from chromatic aberration.

Prior to the description of the subsequent Example 5, a decentered prism optical system used as an ocular optical system of a head-mounted image display apparatus will be described.

Figure 7:
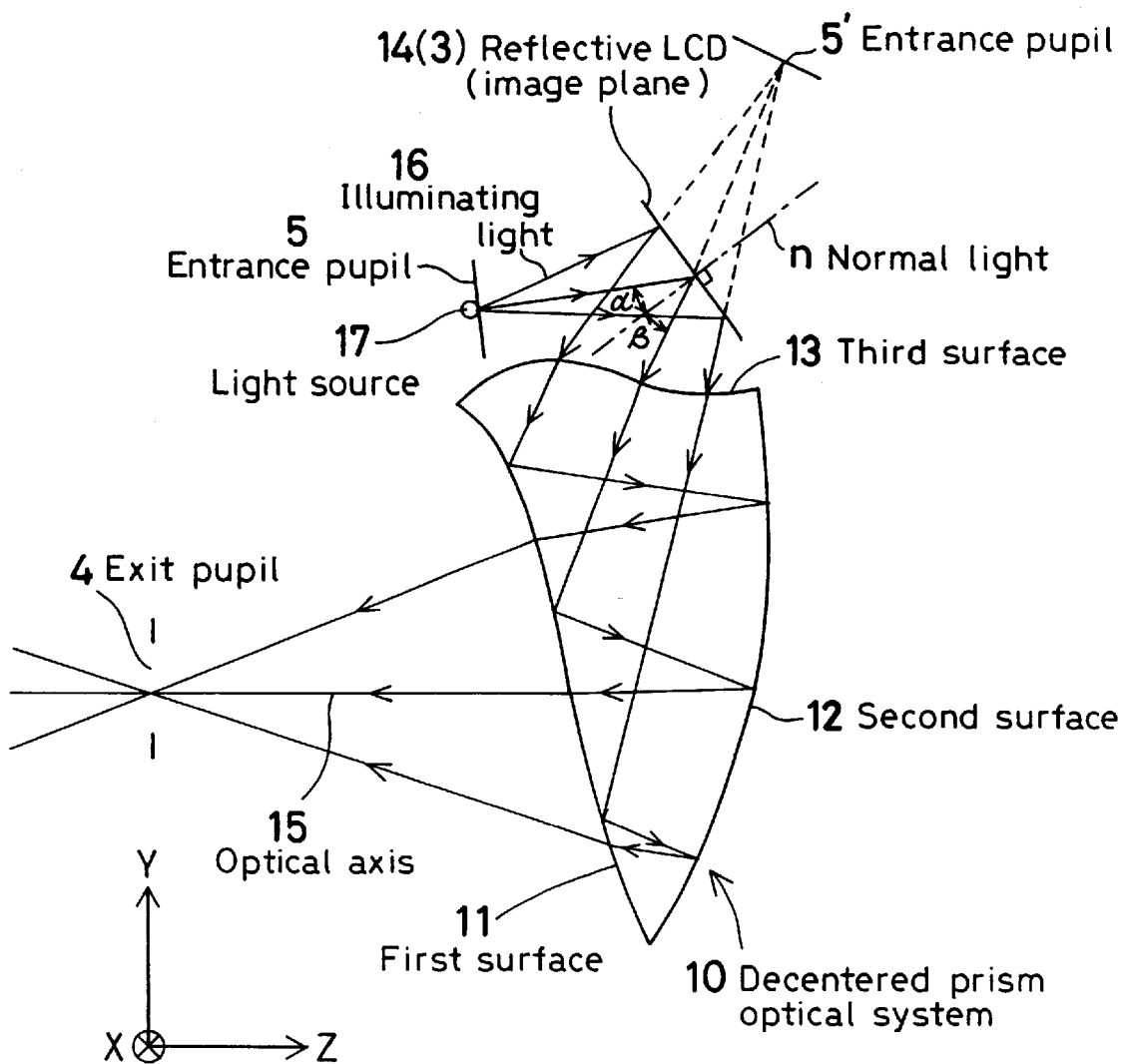
FIG. 7 is a ray path diagram showing an image display apparatus using a decentered prism optical system.

FIG. 7 is a ray path diagram showing an image display apparatus that uses as an ocular optical system a decentered prism optical system 10 having three optical surfaces 11, 12 and 13 that surround a medium having a refractive index larger than 1, as disclosed in Japanese Patent Application Unexamined Publication (KOKAI) No. 7-333551. The decentered prism optical system 10 has an exit pupil 4 positioned to face the first surface 11. A reflective LCD (Liquid Crystal Display) 14 is placed at the position of an image plane 3 facing the third surface 13. A light ray passing through the center of the exit pupil 4 and reaching the center of the image display area of the reflective LCD 14 through the decentered prism optical system 10 in the backward ray tracing is defined as an axial principal ray of the decentered prism optical system 10, and the axial principal ray is defined as an optical axis 15.

In the image display apparatus, display light from the reflective LCD 14, which is placed in the image plane 3, enters the decentered prism optical system 10 through the third surface 13, which is a transmitting surface facing the reflective LCD 14. The light is reflected by the inner side of the first surface 11, which faces the exit pupil 4. Then, the reflected light is incident on the second surface 12, which is located on the opposite side to the exit pupil 4 with respect to the first surface 11. The incident light is reflected by the inner side of the second surface 12. The reflected light exits from the decentered prism optical system 10 through the first surface 11 and enters an observer's pupil placed at the position of the exit pupil 4 without forming an intermediate image. The light forms a display image on the retina of the observer's eye. At least the two reflecting surfaces are decentered with respect to the optical axis 15.

It is desirable from the viewpoint of correcting aberrations due to the decentration of the surfaces that positive power required for the decentered prism optical system 10 to operate as an ocular optical system should be assigned to either or both of the reflecting surfaces 11 and 12, which constitute the decentered prism optical system 10, and that at least one of the reflecting surfaces 11 and 12 should have a rotationally asymmetric surface configuration. This will be described below in detail.

First of all, a coordinate system used in the following description will be described. It should be noted that ray tracing will be described by backward ray tracing in which light from a distant object point passes through the exit pupil 4 and forms an object image on the image display area of the reflective LCD 14 as the image plane 3.

As shown in FIG. 7, a light ray passing through the center of the exit pupil 4 and reaching the center of the image display area of the reflective LCD 14 is defined as an axial principal ray. An optical axis defined by a straight line along which the axial principal ray travels until it intersects the first surface 11 of the decentered prism optical system 10 is assumed to be a Z-axis. An axis perpendicularly intersecting the Z-axis in the decentration plane of each surface constituting the decentered prism optical system 10 is defined as a Y-axis. An axis perpendicularly intersecting both the Z- and Y-axes. is defined as an X-axis.

In general, a spherical lens system comprising only a spherical lens is arranged such that aberrations produced by spherical surfaces, such as spherical aberration, coma and curvature of field, are corrected with some surfaces by canceling the aberrations with each other, thereby reducing aberrations as a whole. On the other hand, aspherical surfaces and the like are used to correct aberrations favorably with a minimal number of surfaces. The reason for this is to reduce various aberrations that would be produced by spherical surfaces. However, in a decentered optical system, rotationally asymmetric aberrations due to decentration cannot be corrected by a rotationally symmetric optical system.

When a rotationally symmetric optical system is decentered, rotationally asymmetric aberrations occur, and it is impossible to correct these aberrations only by a rotationally symmetric optical system. Rotationally asymmetric aberrations due to decentration include distortion, curvature of field, and astigmatic and comatic aberrations, which occur even on the axis. In the above-described decentered prism optical system, a rotationally asymmetric surface is placed in the optical system to correct such rotationally asymmetric aberrations due to decentration.

Rotationally asymmetric aberrations produced by a decentered concave mirror include rotationally asymmetric curvature of field. For example, when light rays from an infinitely distant object point are incident on a decentered concave mirror, the rays are reflected by the concave mirror to form an image. In this case, the back focal length from that portion of the concave mirror on which the rays strike to the image plane (the reflective LCD 14) is a half the curvature of the portion on which the light rays strike. Consequently, an image surface tilted with respect to the axial principal ray is formed. It has heretofore been impossible to correct such rotationally asymmetric curvature of field by a. rotationally symmetric optical system. The tilted curvature of field can be corrected by forming the concave mirror from a rotationally asymmetric surface, and, in this example, arranging it such that the curvature is made strong (refracting power is increased) in the positive Y-axis direction, whereas the curvature is made weak (refracting power is reduced) in the negative Y-axis direction. It is also possible to obtain a flat image surface with a minimal number of constituent surfaces by placing a rotationally asymmetric surface having the same effect as that of the above-described arrangement in the optical system separately from the concave mirror.

Next, rotationally asymmetric astigmatism will be described. A decentered concave mirror produces astigmatism even for axial rays as in the case of the above. The astigmatism can be corrected by appropriately changing the curvatures in the X- and Y-axis directions of the rotationally asymmetric surface as in the case of the above.

Rotationally asymmetric coma will be described below. A decentered concave mirror produces coma even for axial rays as in the case of the above. The coma can be corrected by changing the tilt of the rotationally asymmetric surface according as the distance from the origin of the X-axis increases, and further appropriately changing the tilt of the surface according to the sign (positive or negative) of the Y-axis.

If the decentered prism optical system is arranged to have a folded optical path, it is possible to impart power to a reflecting surface and hence possible to omit a transmission lens. Moreover, because the optical path is folded, the decentered prism optical system can be formed in a compact structure.

If the reflecting surface is a totally reflecting surface tilted with respect to light rays so that the light rays are incident thereon at an angle exceeding the critical angle, a high reflectivity can be obtained, and it is possible to enable the surface to have both reflecting and transmitting actions. The reflecting surface is preferably a reflecting surface having a thin film of a metal, e.g. aluminum or silver, formed thereon, or a reflecting surface formed from a dielectric multilayer film, or a semitransparent reflecting surface. In the case of a metal thin film having reflecting action, a high reflectivity can be readily obtained. The use of a dielectric reflecting film is advantageous in a case where a reflecting film having wavelength selectivity or a reflecting film having minimal absorption is to be formed.

It is preferable to use a rotationally asymmetric surface as a reflecting surface. By doing so, no chromatic aberration is produced in contrast to a case where it is used as a transmitting surface. Moreover, even if the tilt of the surface is small, the surface can bend light rays. Accordingly, the amount of other aberrations produced by the surface is also small. In other words, when the same refracting power is to be obtained, the amount of aberration produced by a reflecting surface is smaller than by a refracting surface.

Examples of rotationally asymmetric surfaces usable in the present invention include an anamorphic surface, a toric surface and a free-form surface. The surface configuration of an anamorphic surface is expressed by the following equation (a):

$$Z=(CX \cdot x^2+CY \cdot y^2)/[1+\{1-(1+K_x)CX^2 \cdot x^2-(1+K_y)CY^2 \cdot y^2\}^{1/2}]+ \Sigma R_n\{(1-P_n)x^2+(1+P_n)y^2\}^n{}_{n=2} \quad (a)$$

where Z is the amount of deviation from a plane tangent to the origin of the surface configuration; CX is the curvature in the X-axis direction; CY is the curvature in the Y-axis direction; $K_x$ is the conical coefficient in the X-axis direction; $K_y$ is the conical coefficient in the Y-axis direction; $R_n$ is the rotationally symmetric component of the aspherical surface term; and $P_n$ is the rotationally asymmetric component of the aspherical surface term.

The surface configuration of a toric surface is expressed by the following equation (b):

$$Z=-\text{Sign}(Rx) \cdot \{(Rx-G(y))^2-x^2\}^{1/2}+Rx \quad (b)$$

where Z is the amount of deviation from a plane tangent to the origin of the surface configuration; Rx is the radius of curvature in the X-axis direction; Sign(Rx) is the sign of the radius of curvature in the X-axis direction; and G(y) is given by $$G(y)=CY \cdot y^2/[1+\{1-(ak+1)CY^2 \cdot y^2\}^{1/2}]+\Sigma ac(n) \cdot y^n{}_{n=2}$$

where CY is the curvature in the Y-axis direction; ak is the conical coefficient; and ac(n) is the aspherical coefficient.

The surface configuration of a free-form surface is expressed by the following equation (c):

$$Z=C_2+C_3y+C_4x+$$
$$C_5y^2+C_6yx+C_7x^2+C_8y^3+C_9y^2x+C_{10}yx^2+C_{11}x^3$$
$$+C_{12}y^4+C_{13}y^3x+C_{14}y^2x^2+C_{15}yx^3+C_{16}x^4+C_{17}y^5+C_{18}y^4x+C_{19}y^3x^2+C_2y^2x^3+C_{21}yx^4$$
$$+C_{22}x^5+C_{23}y^6+C_{24}y^5x+C_{25}y^4x^2+C_{26}y^3x^3+C_{27}y^2x^4$$
$$+C_{28}yx^5+C_{29}x^6+C_{30}y^7+C_{31}y^6x+C_{32}y^5x^2+C_{33}y^4x^3+C_{34}y^3x^4+C_{35}y^2x^5+C_{36}yx^6+C_{37}x^7 \quad (c)$$

where Z is the amount of deviation from a plane tangential to the origin of the surface configuration, and $C_m$ (m is an integer of 2 or higher) are coefficients.

In the above-described decentered prism optical system, it is desirable that at least one reflecting surface having a decentered rotationally asymmetric surface configuration should be formed by using a plane-symmetry free-form surface having only one plane of symmetry. In general, a free-form surface expressed by the above equation (c) does not have planes of symmetry in both the XZ- and YZ-planes. However, a free-form surface having only one plane of symmetry parallel to the YZ-plane (the plane of FIG. 7) is obtained by making all terms with odd-numbered powers of x zero. For example, in the above defining equation (c), the coefficients of the terms $C_4$, $C_6$, $C_9$, $C_{11}$, $C_{13}$, $C_{15}$, $C_{18}$, $C_{20}$, $C_{22}$, $C_{24}$, $C_{26}$, $C_{28}$, $C_{31}$, $C_{33}$, $C_{35}$, $C_{37}$, . . . are set equal to zero. By doing so, it is possible to obtain a free-form surface having only one plane of symmetry parallel to the YZ-plane.

A free-form surface having only one plane of symmetry parallel to the XZ-plane is obtained by making all terms with odd-numbered powers of y zero. For example, in the above defining equation (c), the coefficients of the terms $C_3$, $C_6$, $C_8$, $C_{10}$, $C_{13}$, $C_{15}$, $C_{17}$, $C_{19}$, $C_{21}$, $C_{24}$, $C_{26}$, $C_{28}$, $C_{30}$, $C_{32}$, $C_{34}$, $C_{36}$, . . . are set equal to zero. By doing so, it is possible to obtain a free-form surface having only one plane of symmetry parallel to the XZ-plane. The use of a free-form surface having such a plane of symmetry makes it possible to improve the productivity.

Rotationally asymmetric aberrations due to decentration can be effectively corrected by using a free-form surface having either a plane of symmetry parallel to the YZ-plane or a plane of symmetry parallel to the XZ-plane. The above defining equation is shown as merely an example. The same advantageous effect can be obtained for any other defining equation.

In general, it is difficult to produce a decentered prism optical system having a decentered rotationally asymmetric reflecting surface by polishing, and it is common practice to form constituent surfaces by grinding one by one or by injection molding of a plastic material or molding of a glass material. At this time, it is necessary to check to see whether or not each surface of the decentered prism optical system has been produced with a predetermined configuration. A three-dimensional coordinate measuring device is generally used to measure such a three-dimensional rotationally asymmetric configuration. However, it takes an excessively long time to measure with a three-dimensional coordinate-measuring device.

Therefore, it is more desirable that at least one of the surfaces constituting the decentered prism optical system should be formed from a rotationally symmetric surface, i.e. a spherical surface or a rotationally symmetric aspherical surface.

In the image display apparatus shown in FIG. 7, the reflective LCD 14 is used as an image display device. Therefore, it is necessary to apply illuminating light 16 to the display surface of the reflective LCD 14. Accordingly, in the case of FIG. 7, a point-shaped light source 17 is placed at a position that is within a region including the space between the third surface 13 and the reflective LCD 14 and a space surrounding this space and that is outside the optical path, at which the light source 17 will not intercept the display light.

Moreover, the light source 17 is placed at a position that is in a mirror image relation to the position of an entrance pupil 5' of the decentered prism optical system 10 with respect to the display surface of the reflective LCD 14 (the pixel surface in a case where the pixel surface is not parallel to the display surface) and where an entrance pupil 5 of the decentered prism optical system 10 is similarly formed. With such a positional relationship, the incident angle α of the illuminating light 16 from the light source 17 is approximately equal to the exit angle β of the principal ray of the display light beam from the reflective LCD 14 (i.e. the angle formed by the principal ray of the display light beam with respect to line n normal to the display surface or the pixel surface). Accordingly, it becomes possible to perform bright display. The position of the entrance pupil 5 is in a conjugate relation to the exit pupil 4 with respect to the decentered prism optical system 10.

Figure 8:
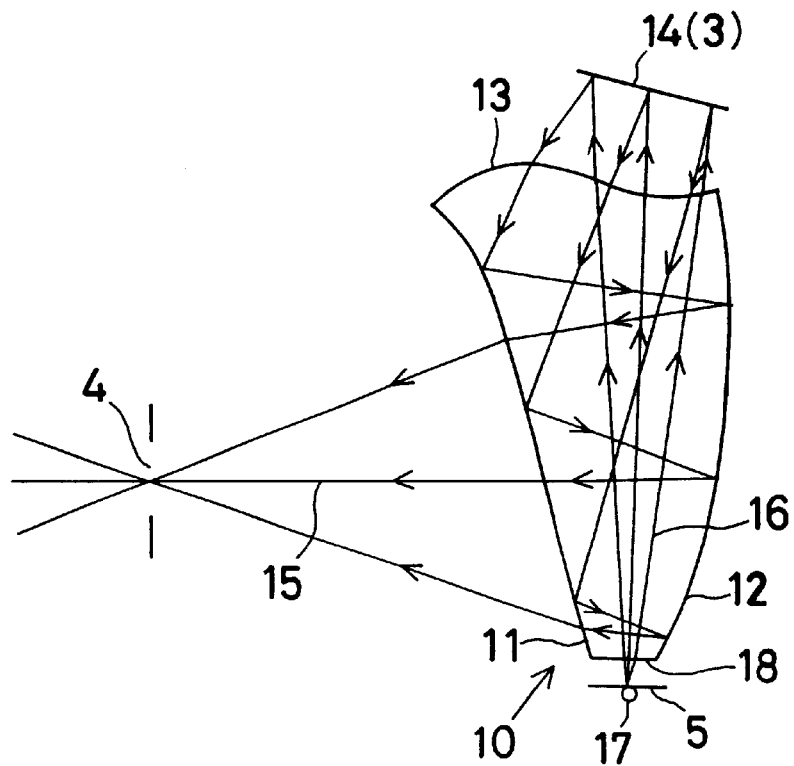
FIG. 8 is a ray path diagram showing an image display apparatus using a decentered prism optical system according to a modification of the optical system shown in FIG. 7.
Figure 9:
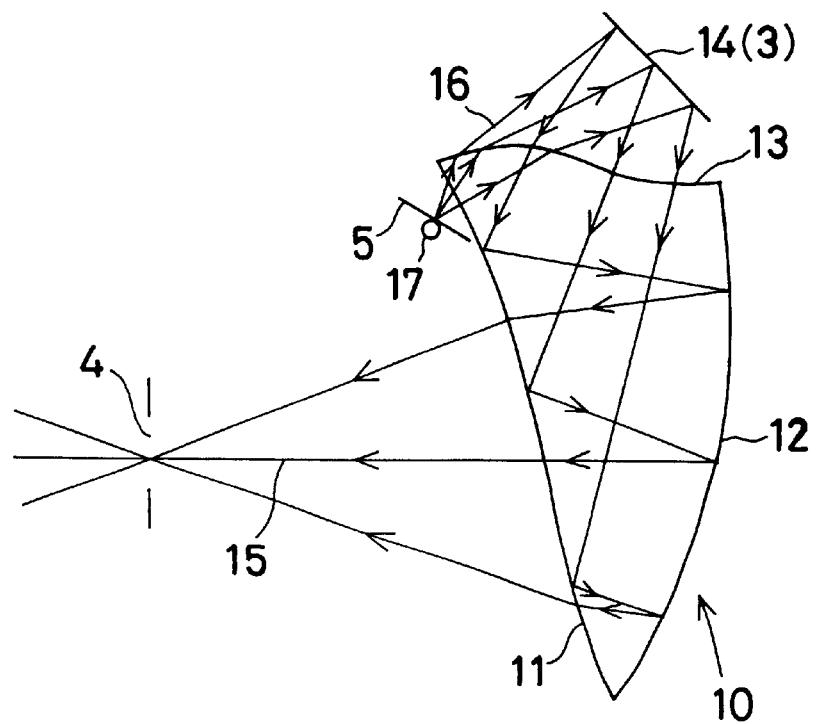
FIG. 9 is a ray path diagram showing an image display apparatus using a decentered prism optical system according to another modification of the optical system shown in FIG. 7.

The position of the entrance pupil 5, which is conjugate to the exit pupil 4 and at which the light source 17 is placed, is not necessarily limited to a position in a region including the space between the third surface 13 and the reflective LCD 14 and a space surrounding this space and outside the optical path, at which the light source 17 will not intercept the display light, as shown in FIG. 7. As shown in FIGS. 8 and 9, the light source 17 may be placed at a position where it can illuminate the display surface (pixel surface) of the reflective LCD 14 through a part of the decentered prism optical system 10 where the display light beam from the reflective LCD 14 does not pass.

In the case of FIG. 8, a portion of the decentered prism optical system 10 on a side thereof opposite to the third surface 13, where the first surface 11 and the second surface 12 intersect each other, is cut off. The position of the entrance pupil 5 is set in front of the cut surface 18, and the light source 17 is placed at the position of the entrance pupil 5. Thus, illuminating light 16 from the light source 17 enters the decentered prism optical system 10 through the cut surface 18, traverses the decentered prism optical system 10, comes out of it through the third surface 13, and illuminates the display surface of the reflective LCD 14.

In the case of FIG. 9, the position of the entrance pupil 5 is set in front of the first surface 11 and near the intersection of the first surface 11 and the third surface 13, and the light source 17 is placed at the position of the entrance pupil 5. Thus, illuminating light 16 from the light source 17 enters the decentered prism optical system 10 through a portion of the first surface 11 near the intersection of the first surface 11 and the third surface 13, traverses the decentered prism optical system 10, comes out of it through the third surface 13, and illuminates the display surface of the reflective LCD 14.

In either case, the illuminating light 16 passes through the inside of the decentered prism optical system 10. However, the light source 17 does not interfere with the display because the illuminating light 16 passes through a portion or in a direction where the display light beam from the reflective LCD 14 does not pass. Moreover, the illuminating light 16 does not cause flare or other similar problem.

The reason why the position of the entrance pupil 5 can be set in a desired direction as stated above when the reflective LCD 14 is used is that the position of the entrance pupil 5, at which the light source 17 is placed, is in a mirror image relation to the entrance pupil 5', which is determined by the arrangement of the decentered prism optical system 10 and the location of the exit pupil 4, with respect to the display surface of the reflective LCD 14 (the pixel surface in a case where the pixel surface is not parallel to the display surface), and that the position (direction) of the entrance pupil 5 changes in accordance with the tilt of the display surface of the reflective LCD 14.

Figure 10:
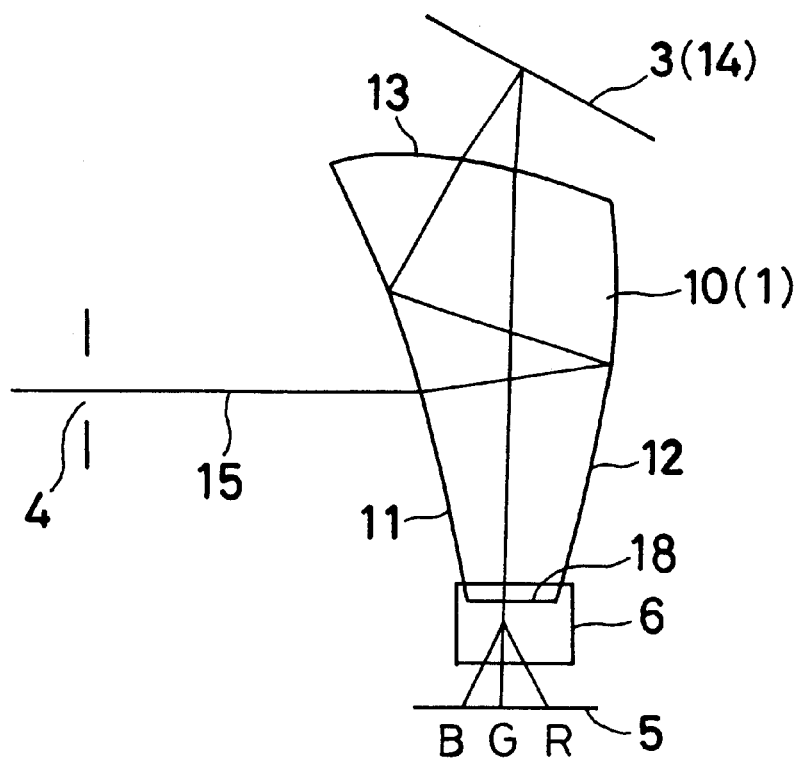
FIG. 10 is a ray path diagram showing an optical system according to Example 5 of the present invention.

Let us return to the description of the examples of the present invention. FIG. 10 is a ray path diagram showing an optical system according to Example 5 of the present invention. In this example, an optical system is constructed by arranging constituent elements as stated above in connection with FIG. 8. As the image-forming optical system 1, a decentered prism optical system 10 having three optical surfaces 11, 12 and 13, as stated in connection with FIG. 7, is used. In FIG. 10, illustration of the object point 2 is omitted. The decentered prism optical system 10 has an exit pupil 4, and a reflective LCD 14 is placed in an image plane 3. Consequently, an entrance pupil 5 is set in front of a cut surface 18 formed by cutting off a portion of the decentered prism optical system 10 on a side thereof opposite to the third surface 13, where the first surface 11 and the second surface 12 intersect each other, as illustrated in the figure. In this example, a chromatic aberration producing device 6 such as the dispersing prism 61, the diffractive optical element 62 or the gradient index optical element 63, shown in Examples 1 to 3, is placed between the image plane 3 and the entrance pupil 5 at a position between the cut surface 18 of the decentered prism optical system 10 and the entrance pupil 5. The operation of this example is the same as that stated in connection with FIG. 1.

Figure 11A:
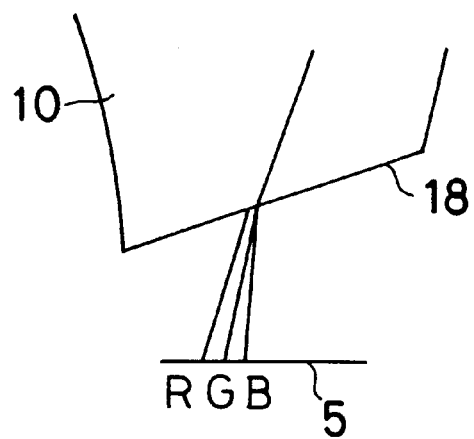
FIG. 11 is a diagram showing a portion in the vicinity of a cut surface of a decentered prism optical system according to a modification of Example 5.
Figure 11B:
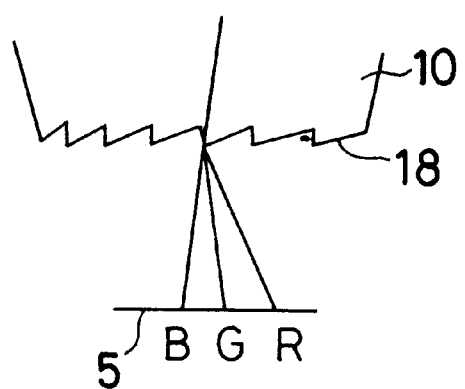

In this example, the chromatic aberration producing device 6 may be provided as an optical element separate from the decentered prism optical system 10 as stated above. Alternatively, the chromatic aberration producing device 6 may be provided as illustrated in parts (a) and (b) of FIG. 11, which show a portion of the decentered prism optical system 10 in the vicinity of the cut surface 18. That is, as shown in part (a) of FIG. 11, the cut surface 18, which is a fourth optical surface of the decentered prism optical system 10, may be cut diagonally to impart chromatic dispersion thereto, thereby allowing the cut surface 18 to serve as a chromatic aberration producing device 6. Alternatively, as shown in part (b) of FIG. 11, the cut surface 18 may be provided with a diffractive optical element, e.g. a diffraction grating or a DOE, so that the cut surface 18 itself serves as a chromatic aberration producing device 6. By doing so, it is possible to reduce the number of parts used in the apparatus and make the apparatus more compact in size and lighter in weight.

Figure 12:
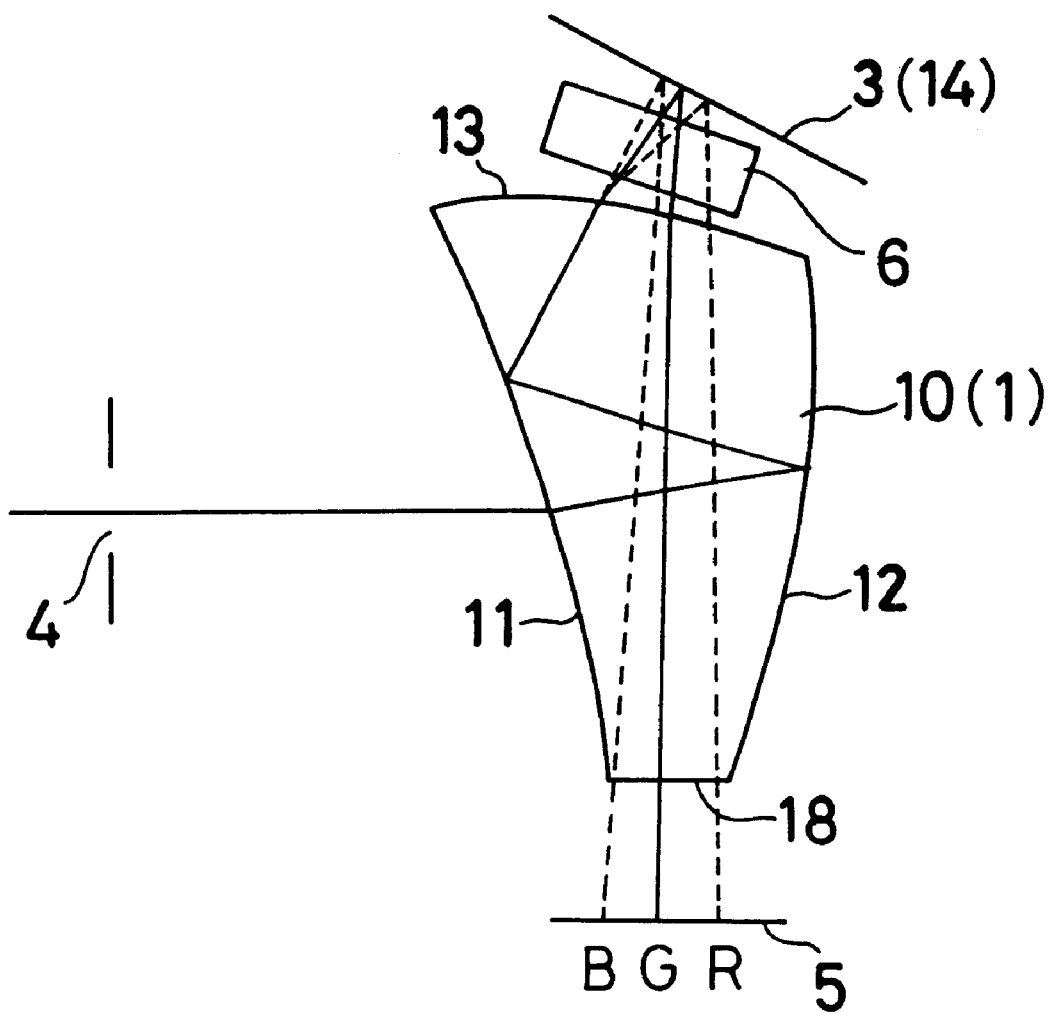
FIG. 12 is a ray path diagram showing an optical system according to Example 6 of the present invention.

FIG. 12 is a ray path diagram showing an optical system according to Example 6 of the present invention. The optical system according to this example also has an arrangement similar to that shown in FIG. 10. In this example, however, a chromatic aberration producing device 6 such as the dispersing prism 61, the diffractive optical element 62 or the gradient index optical element 63, which are shown in Examples 1 to 3, is placed not between the cut surface 18 of the decentered prism optical system 10 and the entrance pupil 5 but between the decentered prism optical system 10 and the image plane 3 (the reflective LCD 14). Regarding the generation of chromatic aberration, the arrangement is equivalent to placing two chromatic aberration producing devices (i.e. common chromatic aberration producing device 6) in front of and behind the image plane 3. Light from an object point (not shown) that passes through the center of the exit pupil 4 in the backward ray tracing passes through the decentered prism optical system 10 and then passes through the chromatic aberration producing device 6. The first passage through the chromatic aberration producing device 6 causes chromatic aberration to be introduced into the light. The aberrated light reaches the image plane 3 and is reflected by the reflective LCD 14 placed in the image plane 3. Then, the reflected light passes through the chromatic aberration producing device 6. The second passage through the chromatic aberration producing device 6 causes the chromatic aberration to be doubled. Then, the aberrated light reaches the entrance pupil 5. Consequently, at the position of the entrance pupil 5, the light has large chromatic aberration. As shown in FIG. 12, the light separates for each wavelength to a considerable extent. The chromatic aberrations on the entrance pupil 5 are those in the image of the exit pupil 4 that is projected onto the entrance pupil 5. If monochromatic light sources of R, G and B are placed individually on the entrance pupil 5 in alignment with the positions of chromatic aberrations in the pupil image produced in the backward ray tracing, it is possible to eliminate chromatic aberrations at the exit pupil 4 in the forward ray tracing.

In this example, however, display light from the reflective LCD 14, which is placed in the image plane 3, passes once through the chromatic aberration producing device 6 before passing through the decentered prism optical system 10 to reach the exit pupil 4 in the forward ray tracing. Therefore, chromatic aberration is introduced into an image to be observed. However, by appropriately controlling the amount of chromatic aberration produced by the chromatic aberration producing device 6, it is possible to allow the chromatic aberration producing device 6 to have the function of a low-pass filter whereby the pixels of the reflective LCD 14 are blurred by the chromatic aberration so as to be inconspicuous.

By virtue of the arrangement of this example, the monochromatic light sources of R, G and B can be placed at the position of the entrance pupil 5 relatively away from each other. Moreover, it is unnecessary to provide a low-pass filter separately. Accordingly, it is possible to reduce the number of parts used in the apparatus and simplify the arrangement.

The foregoing Examples 1 to 6 are schemes devised to place a plurality of monochromatic light sources of different colors in a side-by-side relation to each other at the entrance pupil position. The following in a description of a scheme of preventing the effective area of the exit pupil from reducing when a point source is placed at the entrance pupil position, which would otherwise cause light rays to be vignetted during the observation of an image, making the image difficult or impossible to see.

Figure 13:
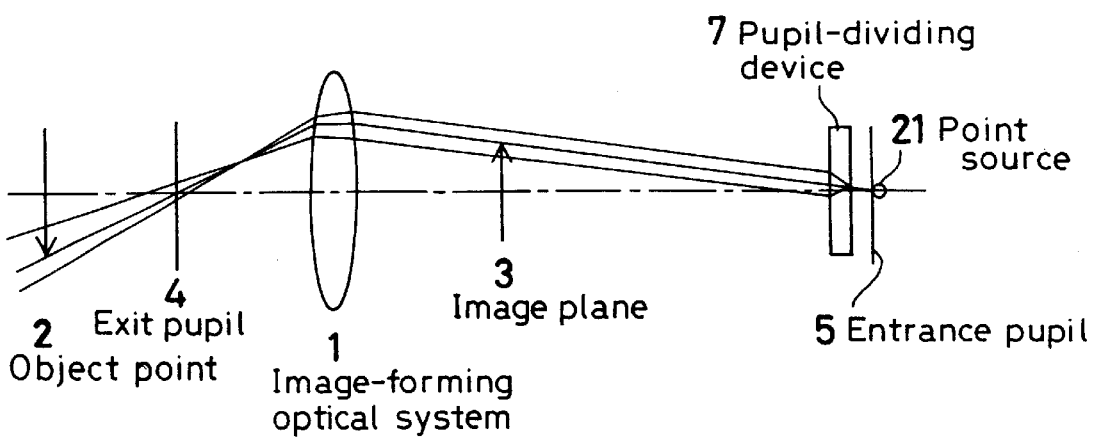
FIG. 13 is a ray path diagram showing a basic form of an optical system in which a pupil-dividing device is provided.

FIG. 13 shows a basic form of an optical system in which a pupil-dividing device is placed to prevent the occurrence of the above-described problem. In the optical system, an object point 2 and an image plane 3, which is conjugate thereto, have been determined with respect to an image-forming optical system 1. When this optical system is actually used as an ocular optical system or a projection optical system, the image plane 3 is the display surface of an image display device or the film plane, and the object point 2 is in a real image plane or a virtual image plane (in the case of a virtual image, the position of the object point 2 is on the same side as the image plane 3 with respect to the image-forming optical system 1). Let us consider the optical system by forward ray tracing in which light rays are traced from the image plane 3 toward the object point 2. There is an exit pupil 4 in the image-forming optical system 1. An entrance pupil 5, which is conjugate to the exit pupil 4, is located at a position on the side of the image plane 3 remote from the image-forming optical system 1.

Figure 14A:
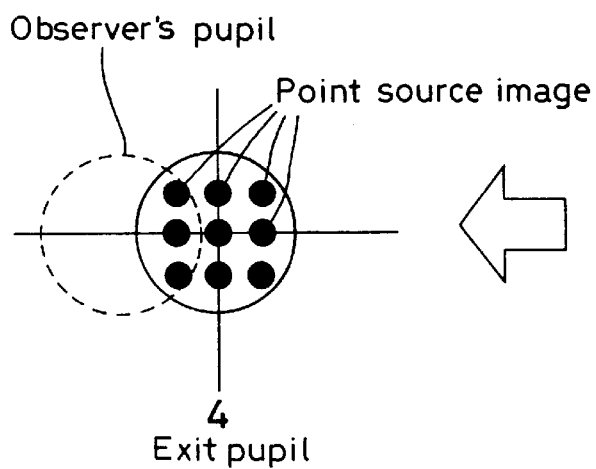
FIG. 14 is a diagram showing the relationship between images of exit and entrance pupils in FIG. 13.
Figure 14B:
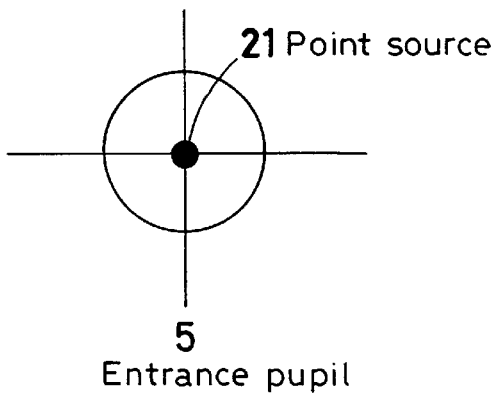

Assuming that a point source 21 for illuminating the display surface of an image display device placed in the image plane 3 is placed in the center of the entrance pupil 5 (see part (b) of FIG. 14), an image of the point source 21 is formed in the center of the exit pupil 4 (the central image in part (a) of FIG. 14). If the observer's pupil is placed off the center of the exit pupil 4 as shown by the dashed line in part (a) of FIG. 14, light from the point source 21 does not enter the observer's pupil (the light is vignetted by the observer's pupil). Consequently, the image of the image display device, which is placed in the image plane 3, becomes invisible. This occurs because the light source placed at the position of the entrance pupil 5 is the point source 21 and hence the effective area of the exit pupil 4 of the image-forming optical system 1 is small.

To prevent the occurrence of the above-described phenomenon, a pupil-dividing device 7 should be placed in an optical path extending from the entrance pupil 5 to the exit pupil 4, as shown in FIG. 13. The optical function of the pupil-dividing device 7 is to form (reproduce) a plurality of images of the point source 21, which is placed at the position of the entrance pupil 5, at the position of the exit pupil 4 such that the images of the point source 21 are displaced relative to each other, as shown in part (a) of FIG. 14. In other words, the pupil-dividing device 7 divides the entrance pupil 5 into a plurality of pupils and superimposes them in such a way that the pupils are displaced relative to each other. Thus, a plurality of images of the point source 21 are formed at the position of the exit pupil 4, being displaced relative to each other. Consequently, even if the observer's pupil is placed off the center of the exit pupil 4 as shown by the dashed line in part (a) of FIG. 14, light from the point source 21 enters the observer's pupil. Therefore, there is no possibility that the image of the image display device, which is placed in the image plane 3, will become invisible.

The following is a description of examples of the present invention based on the optical system shown in FIG. 8, which includes the decentered prism optical system 10 and the reflective LCD 14 placed in the image plane 3 thereof.

Figure 15A:
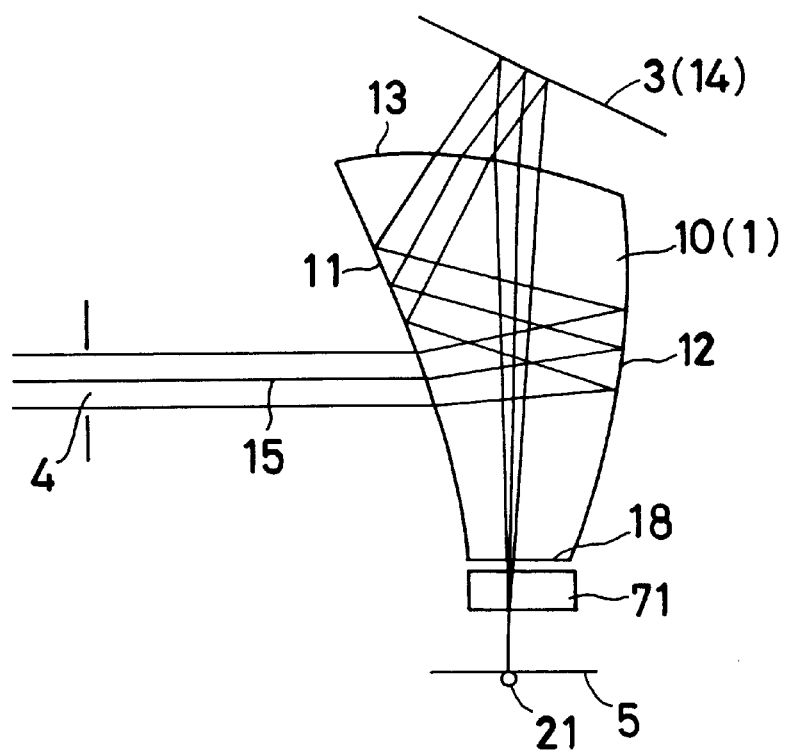
FIG. 15 shows an optical system according to Example 7 of the present invention, in which part (a) is a ray path diagram of the optical system, and part (b) is a plan view of a two-dimensional diffraction grating.
Figure 15B:
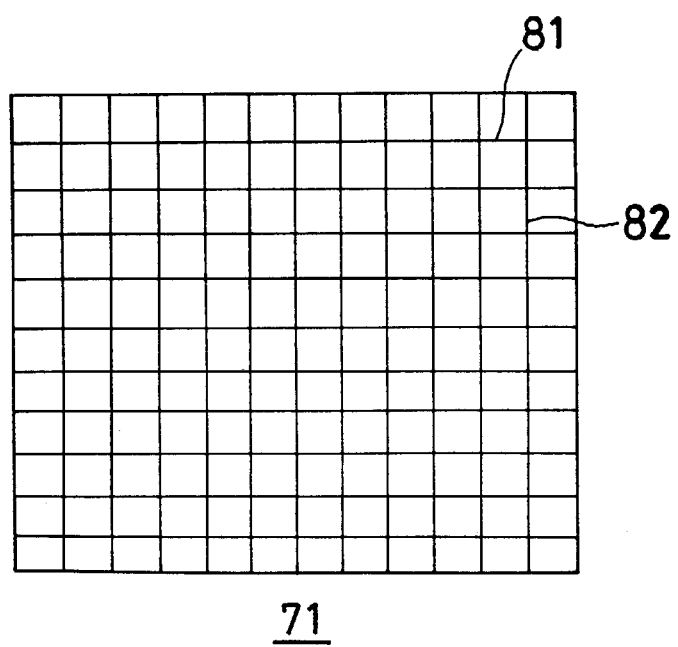

Part (a) of FIG. 15 is a ray path diagram showing an optical system according to Example 7 of the present invention. In this example, the optical system uses as an image-forming optical system 1 a decentered prism optical system 10 having three optical surfaces 11, 12 and 13 as stated in connection with FIG. 7. In part (a) of FIG. 15, illustration of the object point 2 is omitted. The decentered prism optical system 10 has an exit pupil 4. A reflective LCD 14 is placed in an image plane 3 of the decentered prism optical system 10. Thus, an entrance pupil 5 is set in front of a cut surface 18 formed by cutting off a portion of the decentered prism optical system 10 on a side thereof opposite to the third surface 13, where the first surface 11 and the second surface 12 intersect each other, as illustrated in the figure. A two-dimensional diffraction grating 71 is placed between the cut surface 18 of the decentered prism optical system 10 and the entrance pupil 5 as a pupil-dividing device 7 (see FIG. 13). Part (b) of FIG. 15 is a plan view of the two-dimensional diffraction grating 71. As shown in the figure, the two-dimensional diffraction grating 71 is formed by superimposing two diffraction gratings 81 and 82 on the same surface. The diffraction grating 81 has grooves extending in the horizontal direction as viewed in part (b) of FIG. 15. The diffraction grating 82 has grooves extending in the vertical direction. Light from a point source 21, which is placed at the position of the entrance pupil 5, is diffracted two-dimensionally by the two-dimensional diffraction grating 71, and thus a plurality of orders of diffracted light are generated, i.e. plus first-order light, zero-order light, and minus first-order light. Accordingly, the number of images of the point source 21 that corresponds to the number of orders of the diffraction are formed at the position of the exit pupil 4, being displaced relative to each other. Consequently, even if the observer's pupil is placed off the center of the exit pupil 4 as shown by the dashed line in part (a) of FIG. 14, light from the point source 21 enters the observer's pupil. Therefore, it is possible to observe the image of the reflective LCD 14, which is placed in the image plane 3.

Figure 16:
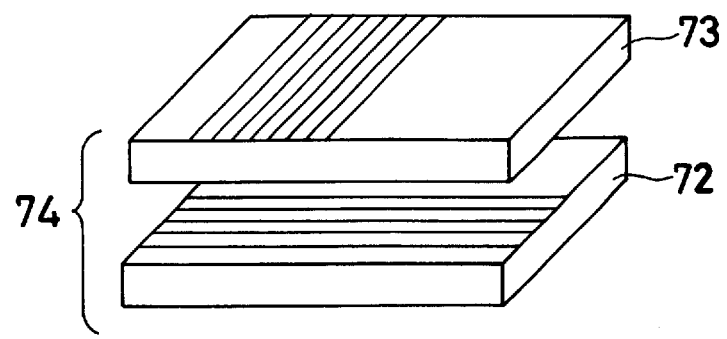
FIG. 16 is a perspective view of a two-dimensional diffraction grating used in Example 8 of the present invention.

FIG. 16 is a perspective view of a two-dimensional diffraction grating 74 used in Example 8 of the present invention, which is formed by superimposing a one-dimensional diffraction grating 72 having grooves extending horizontally and another one-dimensional diffraction grating 73 having grooves extending vertically. In Example 8, the two-dimensional diffraction grating 74, which comprises two one-dimensional diffraction gratings 72 and 73, is used in place of the two-dimensional diffraction grating 71 in Example 7. The rest of Example 8 is the same as that of Example 7. It should be noted that in Example 8 a pair of superimposed lenticular lens plates whose groove directions perpendicularly intersect each other may be used in place of the combination of one-dimensional diffraction gratings 72 and 73.

Figure 17:
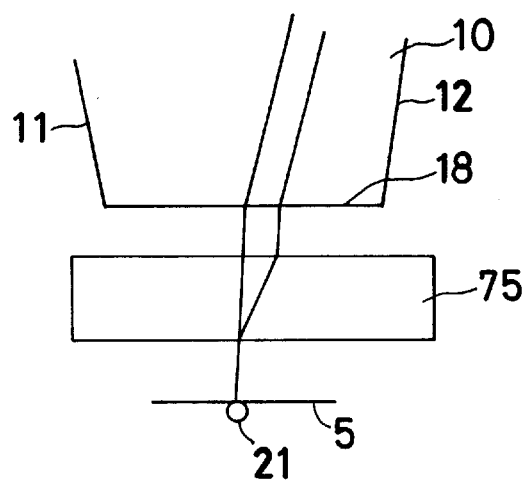
FIG. 17 is a diagram showing a portion in the vicinity of a cut surface of a decentered prism optical system according to Example 9 of the present invention.

FIG. 17 is a diagram showing a portion near a cut surface 18 of a decentered prism optical system 10 according to Example 9 of the present invention. In this example, a birefringent plate 75 having birefringence, e.g. a birefringent filter, is placed as a pupil-dividing device 7 (see FIG. 13) between the cut surface 18 and the entrance pupil 5 in place of the two-dimensional diffraction grating 71 in Example 7 or the two-dimensional diffraction grating 74 in Example 8 or the pair of superimposed lenticular lens plates whose groove directions perpendicularly intersect each other. In this case also, the birefringent plate 75 splits light into ordinary and extraordinary rays. Therefore, the number of images of the point source 21 that corresponds to the number of beams of the split light are formed at the position of the exit pupil 4, being displaced relative to each other. Accordingly, even if the observer's pupil is placed off the center of the exit pupil 4 as shown by the dashed line in part (a) of FIG. 14, light from the point source 21 enters the observer's pupil. Therefore, it is possible to observe the image of the reflective LCD 14, which is placed in the image plane 3.

Figure 18:
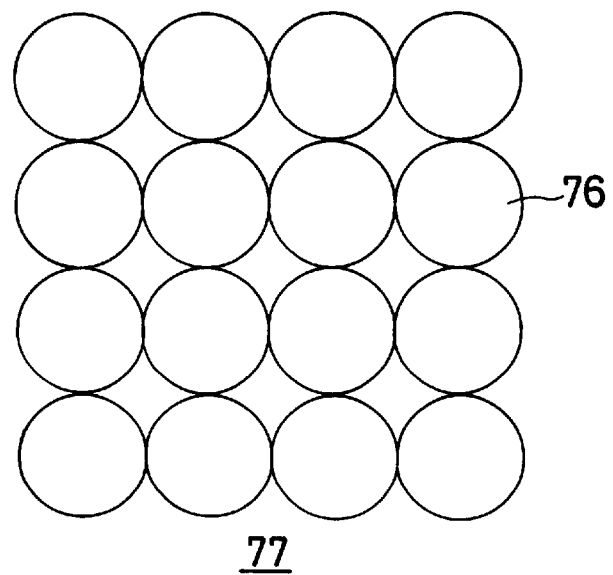
FIG. 18 is a plan view of a micro lens array used in Example 10 of the present invention.

FIG. 18 is a plan view of a micro lens array 77 used in Example 10 of the present invention. The micro lens array 77 has positive or negative micro lenses 76 arranged in a two-dimensional array. In Example 10, the micro lens array 77 is used in place of the two-dimensional diffraction grating 71 in Example 7 or the two-dimensional diffraction grating 74 in Example 8 or the pair of superimposed lenticular lens plates whose groove directions perpendicularly intersect each other, or the birefringent plate 75 in Example 9. The rest of Example 10 is the same as that of Example 7 and so forth. In this example, the micro lens array 77 two-dimensionally reproduces the number of images of the point source 21 that is equal to the number of micro lenses 76. Therefore, the images of the point source 21 are two-dimensionally formed at the position of the exit pupil 4. Accordingly, even if the observer's pupil is placed off the center of the exit pupil 4 as shown by the dashed line in part (a) of FIG. 14, light from the point source 21 enters the observer's pupil. Therefore, it is possible to observe the image of the reflective LCD 14, which is placed in the image plane 3.

Figure 19:
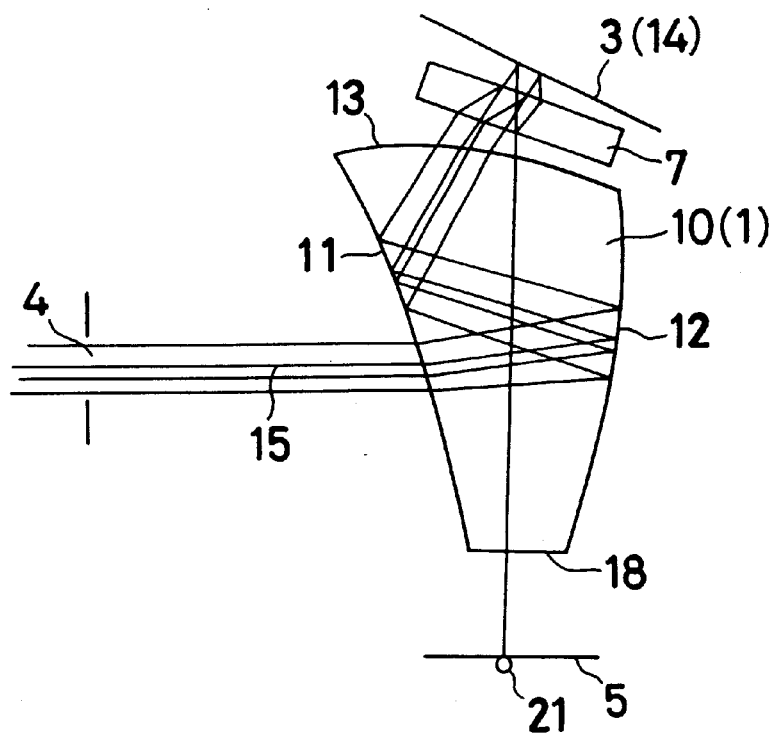
FIG. 19 is a ray path diagram showing an optical system according to Example 11 of the present invention.

FIG. 19 is a ray path diagram showing an optical system according to Example 11 of the present invention. The optical system according to this example also has an arrangement similar to that shown in part (a) of FIG. 15. In this example, however, a pupil-dividing device 7 is placed not between the cut surface 18 of the decentered prism optical system 10 and the entrance pupil 5 but between the decentered prism optical system 10 and the image plane 3 (reflective LCD 14). The pupil-dividing device 7 may be one selected from among the two-dimensional diffraction grating 71, the two-dimensional diffraction grating 74, the pair of superimposed lenticular lens plates Whose groove directions perpendicularly intersect each other, the birefringent plate 75 and the micro lens array 77, which are shown in Examples 7 to 10. A plurality of images of the point source 21 are formed at the position of the exit pupil 4, being displaced relative to each other, and thus the effective area of the exit pupil 4 increases, as in the case of Examples 7 to 10. The arrangement of this example is even more favorable because light from the point source 21 passes through the pupil-dividing device 7 twice and hence the number of divisions of the pupil (i.e. the number of images of the point source 21) increases. In this example, display light from the reflective LCD 14, which is placed in the image plane 3, passes once through the pupil-dividing device 7 before passing through the decentered prism optical system 10 to reach the exit pupil 4. Therefore, the image to be observed involves blur due to multiple image formation. However, by appropriately controlling the amount of displacement of the multiplicity of images produced by pupil-dividing device 7, it is possible to allow the pupil-dividing device 7 to have the function of a low-pass filter whereby the pixels of the reflective LCD 14 are made inconspicuous by the blur.

Figure 20:
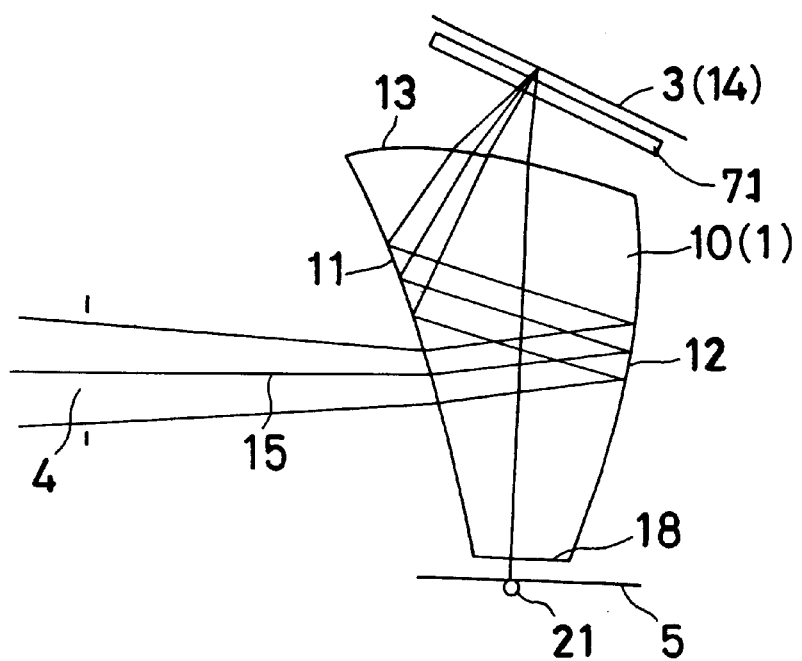
FIG. 20 is a ray path diagram showing an optical system according to Example 12 of the present invention.

FIG. 20 is a ray path diagram showing an optical system according to Example 12 of the present invention. In this example, a two-dimensional diffraction grating 71 is used as a specific pupil-dividing device 7 placed between the decentered prism optical system 10 and the image plane 3 (reflective LCD 14) in Example 11. An optical filter 71, which is formed from a two-dimensional diffraction grating, is placed immediately in front of the reflective LCD 14. Light from the point source 21, which is placed at the position of the entrance pupil 5, is diffracted by the two-dimensional diffraction grating 71 to separate two-dimensionally into plus first-order light, zero-order light, minus first-order light, etc. Consequently, the number of images of the point source 21 that corresponds to the number of orders of the diffraction are formed at the position of the exit pupil 4, being displaced relative to each other. Accordingly, even if the observer's pupil is placed off the center of the exit pupil 4, light from the point source 21 enters the observer's pupil. Therefore, it is possible to observe the image of the reflective LCD 14, which is placed in the image plane 3. At this time, the position in the exit pupil 4 at which an image of the point source 21 is formed by an order of diffracted light other than zero-order light is determined by the periodic structure of the two-dimensional diffraction grating 71.

FIG. 20 is a ray path diagram showing plus first-order light, zero-order light and minus first-order light when a two-dimensional diffraction grating 71 having a periodic structure with a period (pitch) of 4.9 micrometers is placed near the image plane 3. In this case, plus first-order light and minus first-order light form images in the exit pupil 4 at respective positions away from the optical axis 15 by approximately 2 millimeters each. In addition, as the period of the two-dimensional diffraction grating 71 decreases, the amount of displacement of the image formation point relative to the optical axis 15 at the exit pupil 4 increases. Conversely, as the period increases, the amount of displacement decreases. The focal length f of the decentered prism optical system 10 is 16.6 millimeters. Therefore, the value of p/f is p/f=2.9×10$^{-4}$. Here, p is the period of the optical filter 71, and f is the focal length of the decentered prism optical system 10. It is desirable that p/f satisfy the following relationship:

$$6.3\times10^{-5}<(p/f)<1.2\times10^{-2}$$

If p/f is not larger than the lower limit of the above condition, i.e. 6.3×10$^{-5}$, the amount of displacement of the image of the point source 21 at the exit pupil 4 is 10 millimeters or more. Consequently, it may be impossible to observe the image of the reflective LCD 14, which is placed in the image plane 3, depending upon the position of the observer's pupil in the plane of the exit pupil 4. Conversely, if p/f is not smaller than the upper limit, i.e. 1.2×10$^{-2}$, the amount of displacement of the image of the point source 21 at the exit pupil 4 is 0.05 millimeters or less, and it becomes useless to provide the optical filter 71.

It is more desirable to satisfy the following relationship:

$$1.2\times10^{-4}<(p/f)<5.9\times10^{-3}$$

Figure 21:
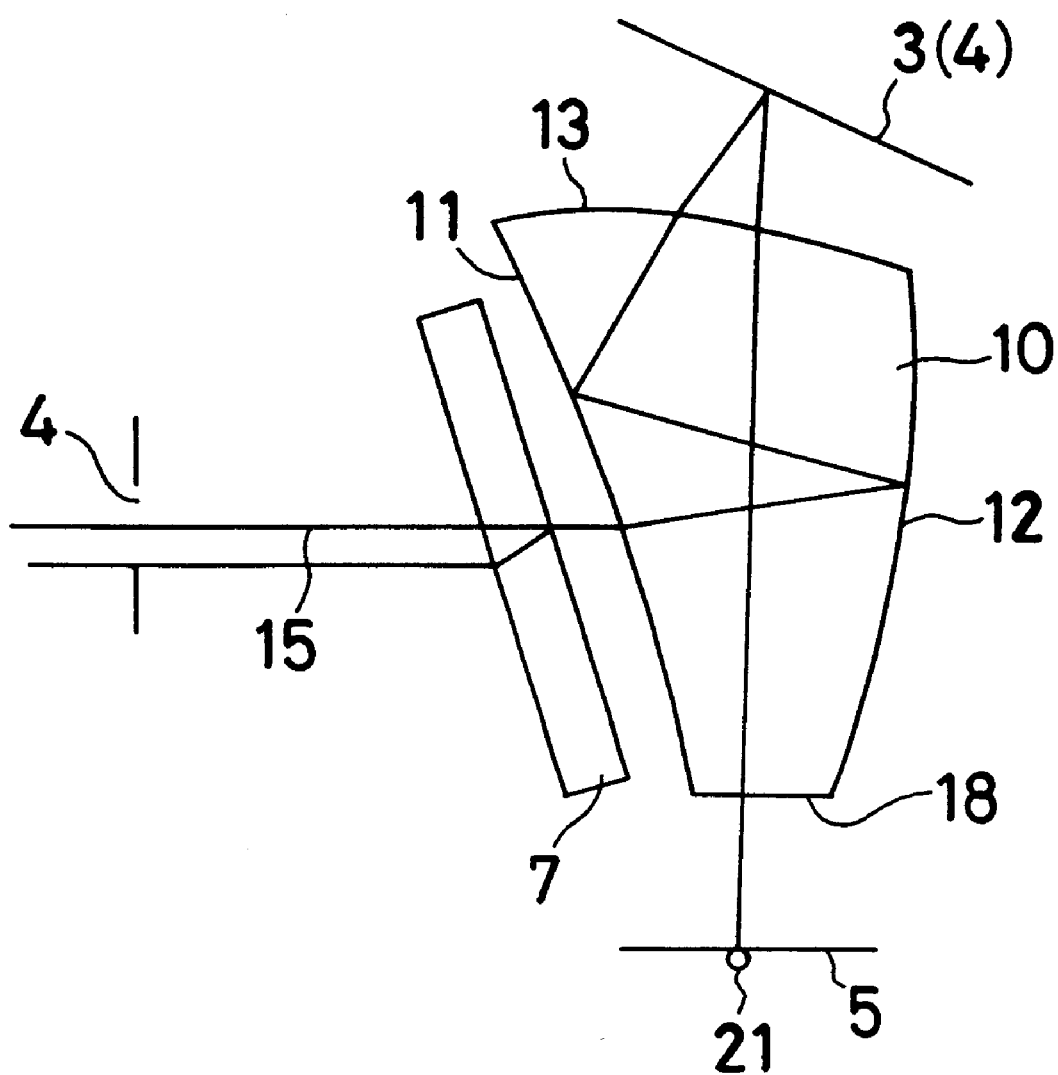
FIG. 21 is a ray path diagram showing an optical system according to Example 13 of the present invention.

FIG. 21 is a ray path diagram showing an optical system according to Example 13 of the present invention. The optical system according to this example also has an arrangement similar to that shown in part (a) of FIG. 15. In this example, however, a pupil-dividing device 7 is placed not between the cut surface 18 of the decentered prism optical system 10 and the entrance pupil 5 but between the exit pupil 4 and the decentered prism optical system 10. The pupil-dividing device 7 may be one selected from among the two-dimensional diffraction grating 71, the two-dimensional diffraction grating 74, the pair of superimposed lenticular lens plates whose groove directions perpendicularly intersect each other, the birefringent plate 75 and the micro lens array 77, which are shown in Examples 7 to 10. A plurality of images of the point source 21 are formed at the position of the exit pupil 4, being displaced relative to each other, and thus the effective area of the exit pupil 4 increases, as in the case of Examples 7 to 10. The arrangement of this example is even more favorable because the pupil-dividing device 7 can be adapted to serve also the function of a protective glass for the decentered prism optical system 10 of a head-mounted image display apparatus.

Figure 22:
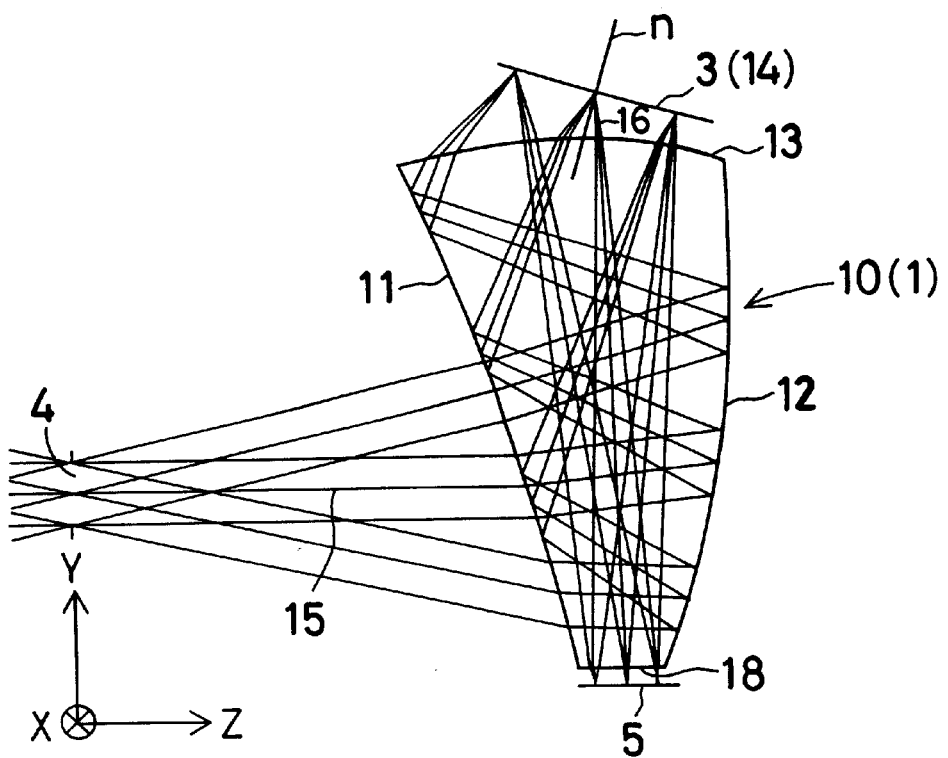
FIG. 22 is a sectional view of an image display apparatus optical system according to Numerical Example 1 of the present invention.
Figure 23:
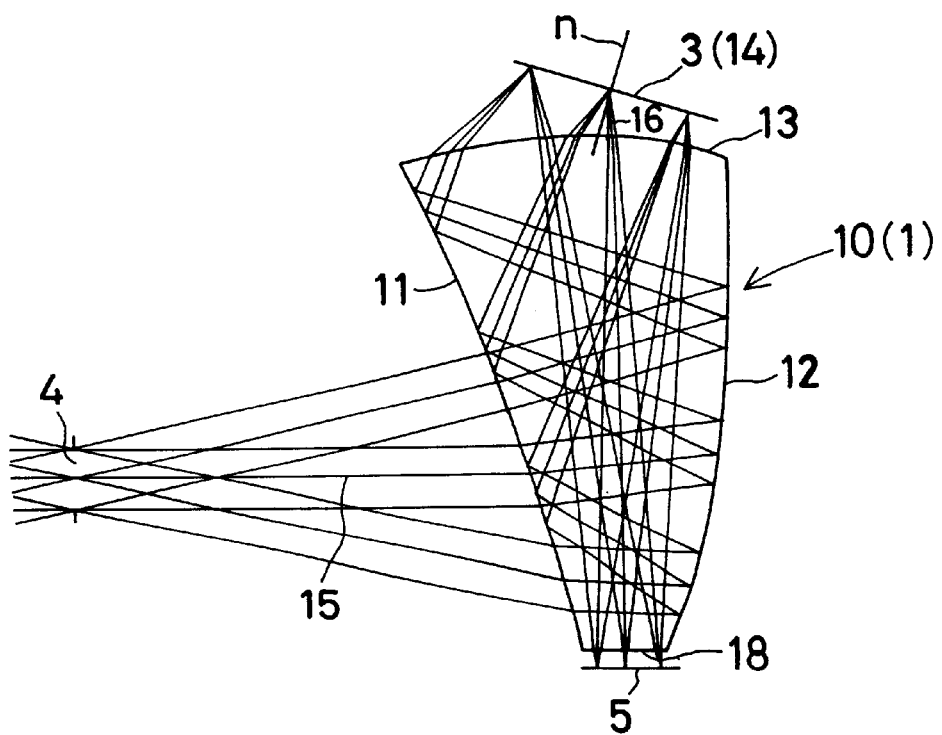
FIG. 23 is a sectional view of an image display apparatus optical system according to Numerical Example 2 of the present invention.

Next, specific numerical examples 1 to 6 of the decentered prism optical system used in the optical system according to the present invention will be described. In constituent parameters of each numerical example (described later), as shown in FIG. 22, the center of an exit pupil 4 of a decentered prism optical system 10 is defined as the origin of the optical system in backward ray tracing, and an optical axis 15 is defined by an axial principal ray passing through the center (origin) of the exit pupil 4. A Z-axis is taken in the direction in which the axial principal ray travels from the exit pupil 4 along the optical axis 15. A Y-axis is taken in the direction extending through the center of the exit pupil 4 at right angles to the Z-axis in a plane in which light rays are bent by the decentered prism optical system 10. An X-axis is taken in the direction extending through the center of the exit pupil 4 at right angles to both the Z- and Y-axes. The direction in which the Z-axis extends from the exit pupil 4 toward the decentered prism optical system 10 is defined as a positive direction of the Z-axis. The direction in which the Y-axis extends from the optical axis 15 toward the image plane 3 (image display device 14) is defined as a positive direction of the Y-axis. The direction in which the X-axis constitutes a right-handed system in combination with the Z- and Y-axes is defined as a positive direction of the X-axis. It should be noted that ray tracing is carried out in a direction in which light rays enter the decentered prism optical system 10 from the exit pupil (4) side of the decentered prism optical system 10, which is defined as an object side.

Regarding decentered surfaces, each surface is given displacements in the X-, Y- and Z-axis directions of the vertex position of the surface from the center of the exit pupil 4, which is the origin of the decentered prism optical system 10, and tilt angles ($\alpha$, $\beta$, and $\gamma$) of the center axis of the surface [in regard to a free-form surface and a rotationally symmetric aspherical surface, the Z-axes of the following equations (c) and (f), respectively] with respect to the X-, Y- and Z-axes. In this case, positive $\alpha$ and $\beta$ mean counterclockwise rotation relative to the positive directions of the corresponding axes, and positive $\gamma$ means clockwise rotation relative to the positive direction of the Z-axis. In addition, the radius of curvature of each spherical surface, surface separation, refractive index of each medium, together with Abbe's number, are given according to the conventional method.

It should be noted that the configuration of a free-form surface, which is a rotationally asymmetric surface, is defined by the following equation. The Z-axis of the defining equation is the axis of the rotationally asymmetric surface.

$$Z=\Sigma_n\Sigma_m C_{nm} X^n Y^{n-m}$$

where $\Sigma_n$ indicates that n of $\Sigma$ is from 0 to k, and $\Sigma_m$ indicates that m of $\Sigma$ is from 0 to n.

In a case where a plane-symmetry free-form surface (i.e. a free-form surface having only one plane of symmetry) is defined by the equation expressing a free-form surface, when symmetry produced by the plane of symmetry is to be obtained in the X-axis direction, terms with odd-numbered powers of X are made zero (for example, the coefficients of the terms with odd-numbered powers of X are set equal to zero). To obtain symmetry produced by the plane of symmetry in the Y-axis direction, terms with odd-numbered powers of Y are made zero (for example, the coefficients of the terms with odd-numbered powers of Y are set equal to zero).

Assuming that k=7 (polynomial of degree 7), for example, a plane-symmetry free-form surface which is symmetric with respect to the X-axis direction is expressed by an expanded form of the above equation as follows:

$$Z = C_2 + C_3Y + C_4X + C_5Y^2 + C_6YX + C_7X^2$$
$$+ C_8Y^3 + C_9Y^2X + C_{10}YX^2 + C_{11}X^3 + C_{12}Y^4 + C_{13}Y^3X + C_{14}Y^2X^2 + C_{15}YX^3 + C_{16}X^4$$
$$+ C_{17}Y^5 + C_{18}Y^4X + C_{19}Y^3X^2 + C_{20}Y^2X^3 + C_{21}YX^4 + C_{22}X^5$$
$$+ C_{23}Y^6 + C_{24}Y^5X + C_{25}Y^4X^2 + C_{26}Y^3X^3 + C_{27}Y^2X^4 + C_{28}YX^5 + C_{29}X^6$$
$$+ C_{30}Y^7 + C_{31}Y^6X + C_{32}Y^5X^2 + C_{33}Y^4X^3 + C_{34}Y^3X^4 + C_{35}Y^2X^5 + C_{36}YX^6 + C_{37}X^7 \quad (c)$$

In the above equation (c), if the coefficients $C_4$, $C_6$, $C_9$ ... of the terms with odd-numbered powers of X are set equal to zero (see numerical examples described later). It should be noted that coefficients concerning aspherical surfaces which are not shown in the constituent parameters (shown later) are zero.

Plane-symmetry free-form surfaces may also be defined by Zernike polynomials. That is, the configuration of a free-form surface may be defined by the following equation (d). The Z-axis of the defining equation (d) is the axis of Zernike polynomial.

$$X = R \times \cos(A)$$
$$Y = R \times \sin(A)$$
$$Z = D_2 + D_3 R \cos(A) + D_4 R \sin(A) + D_5 R^2 \cos(2A) + D_6(R^2-1) + D_7 R^2 \sin(2A)$$
$$+ D_8 R^3 \cos(3A) + D_9(3R^{3-2}R)\cos(A) + D_{10}(3R^{3-2}R)\sin(A) + D_{11}R^3 \sin(3A)$$
$$+ D_{12}R^4 \cos(4A) + D_{13}(4R^{4-3}R^2)\cos(2A) + D_{14}(6R^4 - 6R^2 + 1) + D_{15}(4R^4 - 3R^2)\sin(2A)$$
$$+ D_{16}R^4 \sin(4A) + D_{17}R^5 \cos(5A) + D_{18}(5R^5 - 4R^3)\cos(3A) +$$
$$D_{19}(10R^5 - 12R^3 + 3R)\cos(A) + D_{20}(10R^5 - 12R^3 + 3R)\sin(A) +$$
$$D_{21}(5R^5 - 4R^3)\sin(3A) + D_{22}R^5 \sin(5A) + D_{23}R^6 \cos(6A) + D_{24}(6R^6 - 5R^4)\cos(4A) +$$
$$D_{25}(15R^6 - 20R^4 + 6R^2)\cos(2A) + D_{26}(20R^6 - 30R^4 + 12R^2 - 1) +$$
$$D_{27}(15R^6 - 20R^4 + 6R^2)\sin(2A) + D_{28}(6R^6 - 5R^4)\sin(4A) + D_{29}R^6 \sin(6A) \quad (d)$$

It should be noted that in the above equation the surface is expressed as symmetric with respect to the X-axis direction. In the defining equation, $D_m$ is (m is an integer of 2 or higher) are coefficients.

As an example of other expressions of surfaces usable in the present invention, the above defining equation ($Z = \Sigma_n \Sigma_m C_{nm} X^n Y^{n-m}$) may be expanded to express a surface which is symmetric with respect to the X-axis direction and in which k=7, as shown by the following equation (e) as in the case of equation (c):

$$Z = C_2 + C_3Y^2 + C_4|X| + C_5Y^2 + C_6Y|X| + C_7X^2$$
$$+ C_8Y^3 + C_9Y^2|X| + C_{10}YX^2 + C_{11}|X^3| + C_{12}Y^4 + C_{13}Y^3|X| + C_{14}Y^2X^2 + C_{15}Y|X^3| + C_{16}X^4$$
$$+ C_{17}Y^5 + C_{18}Y^4|X| + C_{19}Y^3X^2 + C_{20}Y^2|X^3| + C_{21}YX^4 + C_{22}|X^5|$$
$$+ C_{23}Y^6 + C_{24}Y^5|X| + C_{25}Y^4X^2 + C_{26}Y^3|X^3| + C_{27}Y^2X^4 + C_{28}Y|X^5| + C_{29}X^6$$
$$+ C_{30}Y^7 + C_{31}Y^6|X| + C_{32}Y^5X^2 + C_{33}Y^4|X^3| + C_{34}Y^3X^4 + C_{35}Y^2|X^5| + C_{36}YX^6 + C_{37}|X^7| \quad (e)$$

The configuration of a rotationally symmetric aspherical surface is given by the following equation. The Z-axis of the defining equation is the axis of the rotationally symmetric asymmetric surface.

$$Z = (Y^2/R)/[1 + \{1 - P(Y^2/R^2)\}^{1/2}] + A_4 Y^4 + A_6 Y^6 + A_8 Y^8 + A_{10} Y^{10} \quad (f)$$

where Y is a direction perpendicular to Z; R is a paraxial curvature radius; P is a conical coefficient; and $A_4$, $A_6$, $A_8$, and $A_{10}$ are aspherical coefficients, respectively.

In the constituent parameters (shown later), those terms concerning aspherical surfaces for which no data is shown are zero. The refractive index is expressed by the refractive index for the spectral d-line (wavelength: 587.56 nanometers). Lengths are given in millimeters.

Figure 24:
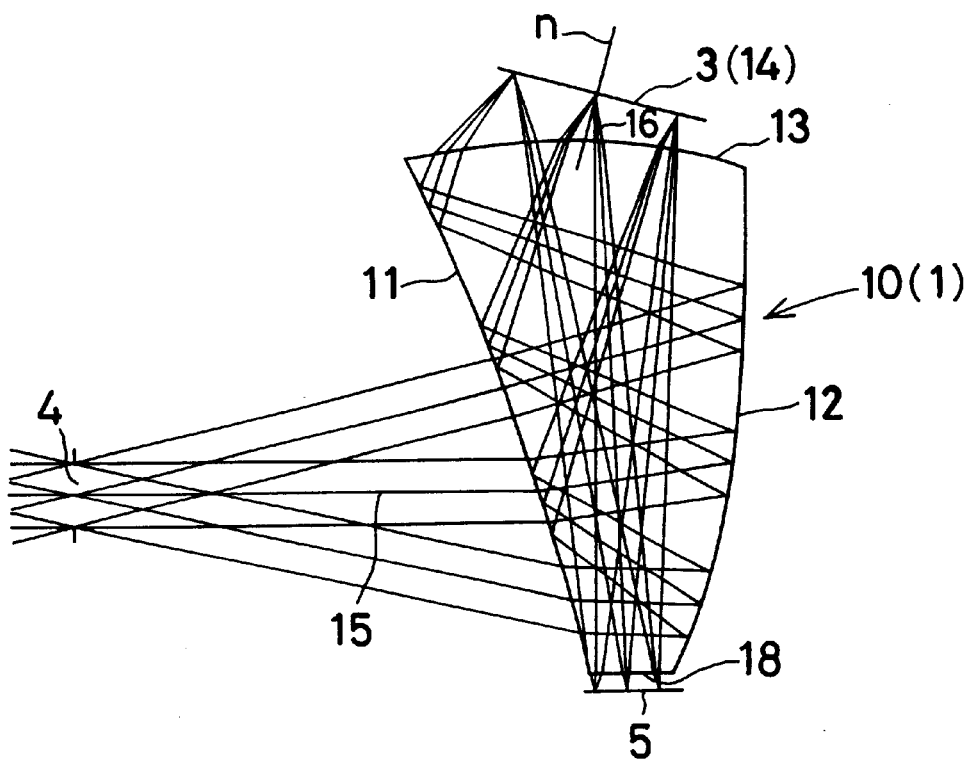
FIG. 24 is a sectional view of an image display apparatus optical system according to Numerical Example 3 of the present invention.
Figure 25:
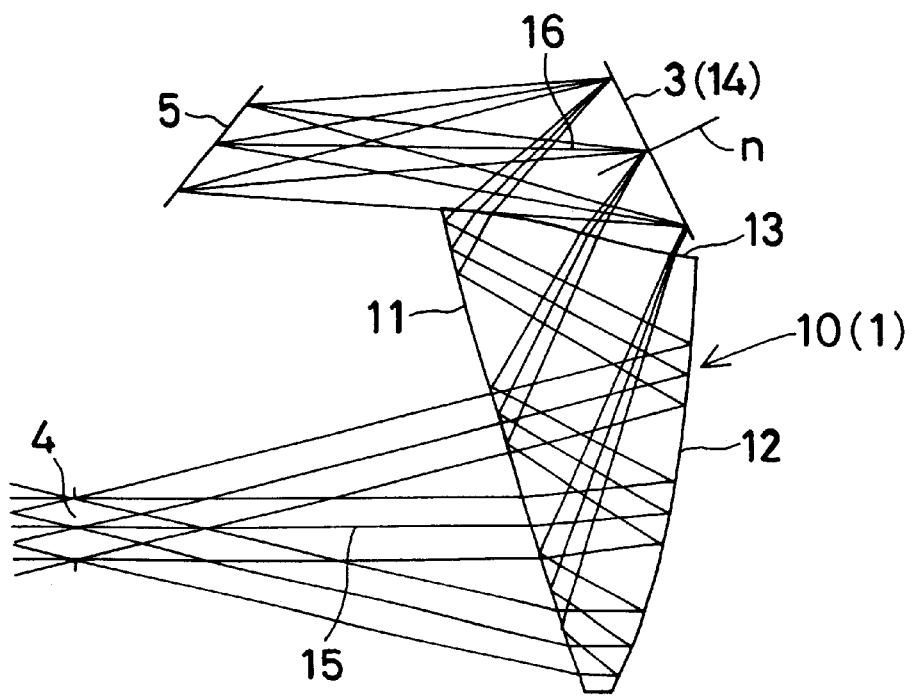
FIG. 25 is a sectional view of an image display apparatus optical system according to Numerical Example 4 of the present invention.
Figure 26:
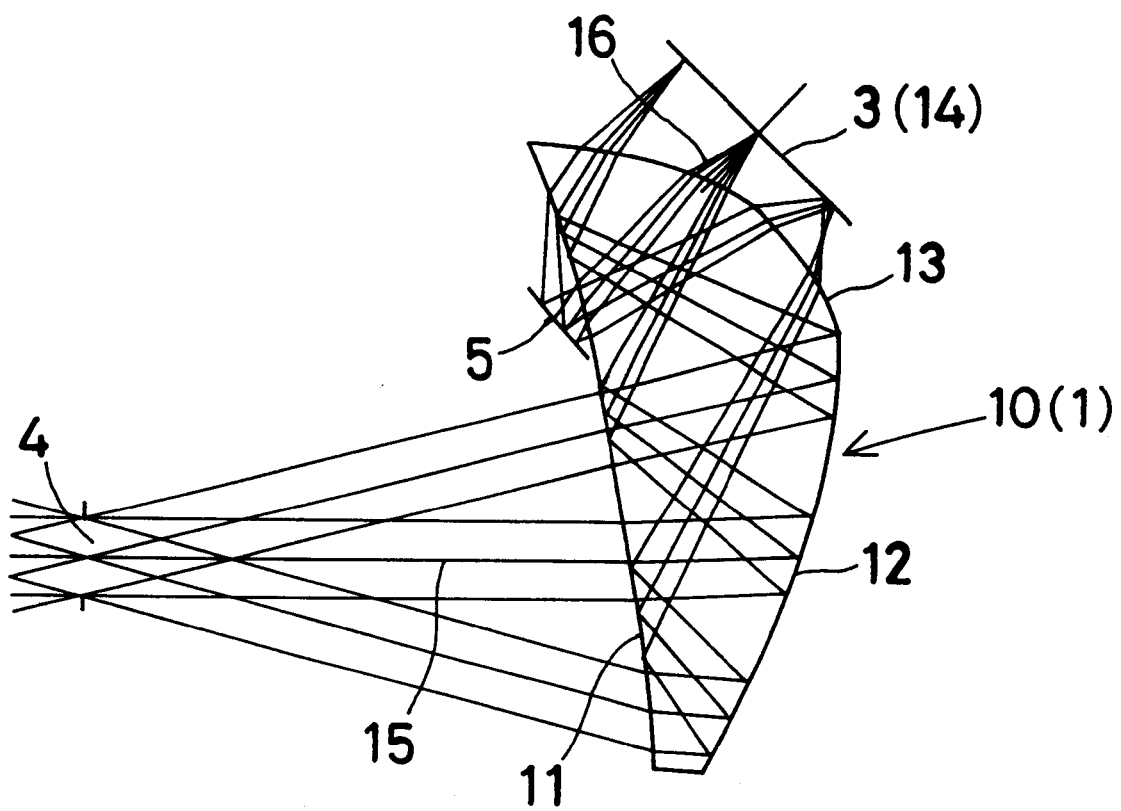
FIG. 26 is a sectional view of an image display apparatus optical system according to Numerical Example 5 of the present invention.
Figure 27:
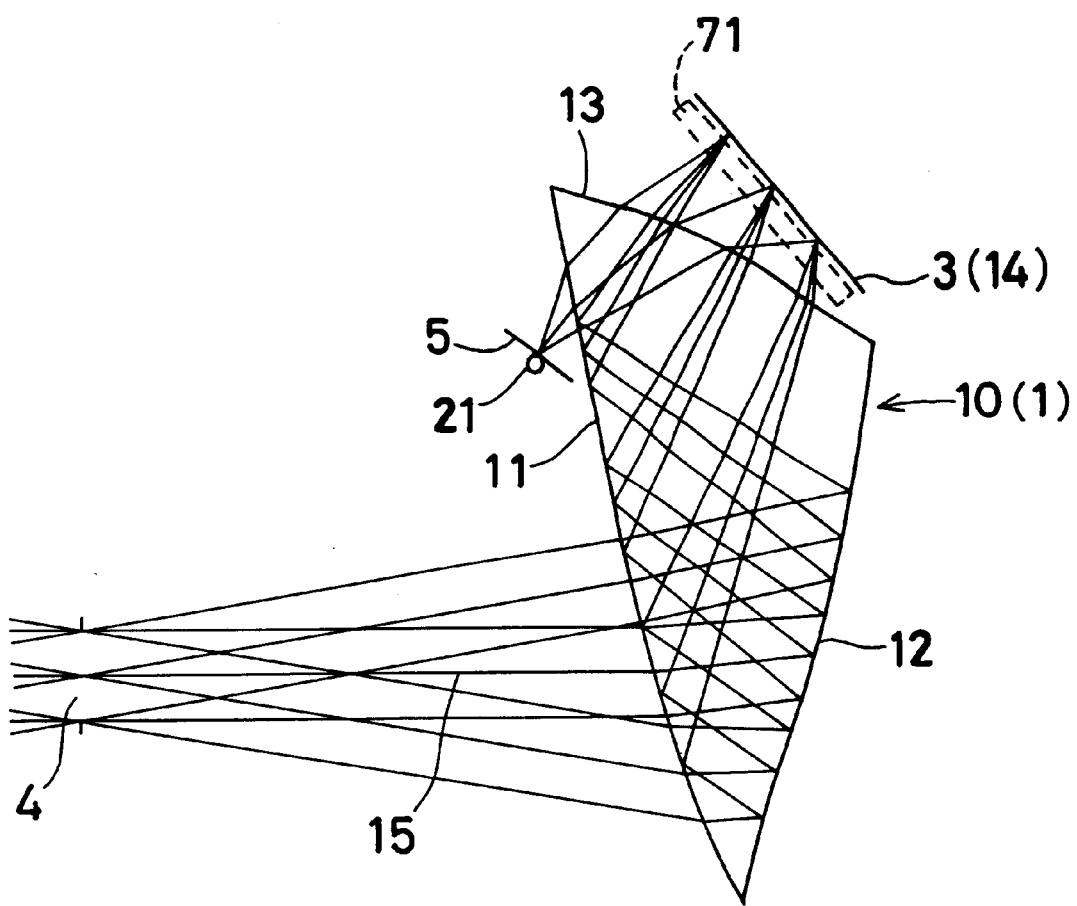
FIG. 27 is a sectional view of an image display apparatus optical system according to Numerical Example 6 of the present invention.

FIGS. 22 to 27 are sectional views of Numerical Examples 1 to 6, taken along the YZ-plane containing the optical axis 15 of the decentered prism optical system 10 of the image display apparatus optical system. The decentered prism optical system 10 according to any of Numerical Examples 1 to 6 has three surfaces 11, 12 and 13 as in the case of FIG. 7. The space between the three surfaces 11 to 13 is filled with a transparent medium having a refractive index larger than 1. A bundle of light rays from an object (not shown) first passes through the exit pupil 4 of the decentered prism optical system 10 along the optical axis 15 and then enters the decentered prism optical system 10 through the first surface 11, which has both transmitting and reflecting actions. The incident rays are reflected toward the exit pupil 4 by the second surface 12, which is a reflecting surface placed on a side of the decentered prism optical system 10 remote from the exit pupil 4 and has only a reflecting action. The reflected rays are further reflected by the first surface 11 so as to travel away from the exit pupil 4. The reflected rays pass through the third surface 13, which has only a transmitting action, and reach the display surface of the reflective LCD 14, which is placed at the position of the image plane 3. The rays are specularly reflected by the display surface of the reflective LCD 14. Then, in the case of FIGS. 22 to 24, the reflected light enters the decentered prism optical system 10 through the third surface 13 as in the case of FIG. 8. The light traverses the decentered prism optical system 10 and comes out of it through a cut surface 18 formed by cutting off a portion of the decentered prism optical system 10 on a side thereof opposite to the third surface 13, where the first surface 11 and the second surface 12 intersect each other. Then, the light reaches an entrance pupil 5, which is positioned in front of the cut surface 18. In the case of FIG. 25, the light specularly reflected by the display surface of the reflective LCD 14 reaches an entrance pupil 5 set closer to the exit pupil 4 in a space between the third surface 13 and the reflective LCD 14 as in the case of FIG. 7. In the case of FIGS. 26 and 27, the light specularly reflected by the display surface of the reflective LCD 14 enters the decentered prism optical system 10 through the third surface 13, traverses a portion of the decentered prism optical system 10 near the intersection of the third surface 13 and the first surface 11, comes out of the decentered prism optical system 10 through the first surface 11 to a side thereof closer to the exit pupil 4, and reaches an entrance pupil 5 set in front of the first surface 11 as in the case of FIG. 9. It should be noted that Numerical Example 6, which is shown in FIG. 27, premises that a two-dimensional diffraction grating 71 is placed as a pupil-dividing device 7 between the third surface 13 and the image plane 3 as in the case of the example shown in FIG. 20.

In the case of FIG. 22 (Numerical Example 1), FIG. 24 (Numerical Example 3), FIG. 25 (Numerical Example 4), FIG. 26 (Numerical Example 5) and FIG. 27 (Numerical Example 6), the exit pupil 4 and the entrance pupil 5 are in a conjugate relation to each other only in the YZ-plane, but not in the XZ-plane. Therefore, in Numerical Example 2, a line source elongated in the direction X is used as a light source placed at the position of the entrance pupil 5.

In Numerical Examples 1, 2 and 5, the first surface 11 is a rotationally symmetric aspherical surface defined by the above equation (f), which is decentered and has a concave surface directed toward the exit pupil 4. In Numerical Examples 3 and 6, the first surface 11 is a free-form surface defined by the above equation (c). In Numerical Example 4, the first surface 11 is a rotationally symmetric aspherical surface defined by the above equation (f), which is decentered and has a convex surface directed toward the exit pupil 4. In all Numerical Examples 1 to 6, the second surface 12 and the third surface 13 are each formed from a free-form surface defined by the above equation (c).

Numerical Examples 1 to 5 are adapted to use a 0.7-inch diagonal type reflective LCD 14 with an image display area 14.4 millimeters in length and 10.7 millimeters in breadth. Numerical Example 6 is adapted to use a 0.4-inch diagonal type reflective LCD 14 with an image display area 8.13 millimeters in length and 6.10 millimeters in breadth. In Numerical Examples 1 to 3, the horizontal field angle is 33 degrees, and the vertical field angle is 25.1 degrees. In Numerical Examples 4 and 5, the horizontal field angle is 35 degrees, and the vertical field angle is 26.6 degrees. In Numerical Example 6, the horizontal field angle is 25 degrees, and the vertical field angle is 18.9 degrees. In all Numerical Examples 1 to 6, the exit pupil diameter is 4 millimeters.

Constituent parameters of the above-described Numerical Examples 1 to 6 are shown below. In Numerical Examples 1 to 3, surface Nos. 7 and 8 subsequent to the image plane are the third surface 13 and the cut surface 18; in Numerical Examples 5 and 6, they are the third surface 13 and the first surface 11. It should be noted that free-form surfaces are denoted by "FFS".

Numerical Example 1

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞(Exit pupil) | | | | |
| 2 | −167.90 (Aspheric) | | (1) | 1.5254 | 56.2 |
| 3 | FFS[1] | | (2) | 1.5254 | 56.2 |
| 4 | −167.90 (Aspheric) | | (1) | 1.5254 | 56.2 |
| 5 | FFS[2] | | (3) | | |
| Image plane | ∞ | | (4) | | |
| 7 | FFS[2] | | (3) | 1.5254 | 56.2 |
| 8 | ∞ | | (5) | | |
| Entrance pupil | ∞ | | (6) | | |

Aspherical Coefficients
Surface No.: 2, 4

$P = 1$
$A_4 = 1.3861 \times 10^{-6}$
$A_6 = -1.5957 \times 10^{-9}$

FFS[1]

$C_5\ -7.5462 \times 10^{-3}$  $C_7\ -7.8676 \times 10^{-3}$  $C_8\ 5.6453 \times 10^{-5}$
$C_{10}\ 2.7553 \times 10^{-5}$  $C_{12}\ 5.3969 \times 10^{-7}$  $C_{14}\ 6.0288 \times 10^{-7}$
$C_{16}\ -3.2424 \times 10^{-7}$  $C_{17}\ -3.6709 \times 10^{-8}$  $C_{19}\ 9.4121 \times 10^{-8}$
$C_{21}\ -5.0850 \times 10^{-9}$

FFS[2]

$C_5\ -1.2220 \times 10^{-2}$  $C_7\ -1.3558 \times 10^{-2}$  $C_8\ -2.5977 \times 10^{-4}$
$C_{10}\ 2.9678 \times 10^{-4}$  $C_{14}\ 5.5478 \times 10^{-6}$  $C_{16}\ 3.1550 \times 10^{-5}$
$C_{17}\ 2.6777 \times 10^{-6}$  $C_{19}\ -1.7874 \times 10^{-6}$  $C_{21}\ -3.9576 \times 10^{-7}$ Displacement and tilt(1)

| X | 0.00 | Y | 8.59 | Z | 27.10 |
| α | 21.17 | β | 0.00 | γ | 0.00 |

Displacement and tilt(2)

| X | 0.00 | Y | 1.39 | Z | 42.54 |
| α | −9.30 | β | 0.00 | γ | 0.00 |

Displacement and tilt(3)

| X | 0.00 | Y | 22.01 | Z | 32.70 |
| α | 90.03 | β | 0.00 | γ | 0.00 |

Displacement and tilt(4)

| X | 0.00 | Y | 24.99 | Z | 34.86 |
| α | 74.53 | β | 0.00 | γ | 0.00 |

Displacement and tilt(5)

| X | 0.00 | Y | −12.00 | Z | 32.00 |
| α | 90.00 | β | 0.00 | γ | 0.00 |

Displacement and tilt(6)

| X | 0.00 | Y | −13.00 | Z | 36.50 |
| α | 90.00 | β | 0.00 | γ | 0.00 |

Numerical Example 2

| Surface No. | Radius of curvature | Surface separation | Displacement and tilt | Refractive index | Abbe's No. |
|---|---|---|---|---|---|
| Object plane | ∞ | −1000.00 | | | |
| 1 | ∞(Exit pupil) | | | | |
| 2 | −168.57 (Aspheric) | | (1) | 1.5254 | 56.2 |
| 3 | FFS[1] | | (2) | 1.5254 | 56.2 |
| 4 | −168.57 (Aspheric) | | (1) | 1.5254 | 56.2 |
| 5 | FFS[2] | | (3) | | |
| Image plane | ∞ | | (4) | | |
| 7 | FFS[2] | | (3) | 1.5254 | 56.2 |
| 8 | ∞ | | (5) | | |
| Entrance pupil | ∞ | | (6) | | |

-continued

Aspherical Coefficients
Surface No.: 2, 4

P = 1
$A_4 = 9.2941 \times 10^{-7}$
$A_6 = -1.6509 \times 10^{-9}$

FFS[1]

| | | |
|---|---|---|
| $C_5$ $-7.5328 \times 10^{-3}$ | $C_7$ $-7.8680 \times 10^{-3}$ | $C_8$ $6.1807 \times 10^{-5}$ |
| $C_{10}$ $2.1866 \times 10^{-5}$ | $C_{12}$ $5.9433 \times 10^{-7}$ | $C_{14}$ $4.5365 \times 10^{-7}$ |
| $C_{16}$ $2.4863 \times 10^{-7}$ | $C_{17}$ $-6.1413 \times 10^{-9}$ | $C_{19}$ $1.1857 \times 10^{-7}$ |
| $C_{21}$ $4.9232 \times 10^{-8}$ | | |

FFS[2]

| | | |
|---|---|---|
| $C_5$ $-1.2256 \times 10^{-2}$ | $C_7$ $-6.5166 \times 10^{-3}$ | $C_8$ $-2.0673 \times 10^{-4}$ |
| $C_{10}$ $5.7020 \times 10^{-5}$ | $C_{14}$ $-2.1224 \times 10^{-6}$ | $C_{16}$ $-5.9028 \times 10^{-5}$ |
| $C_{17}$ $1.7875 \times 10^{-6}$ | $C_{19}$ $-1.7235 \times 10^{-6}$ | $C_{21}$ $4.9652 \times 10^{-6}$ |

Displacement and tilt(1)

| X | 0.00 | Y | 8.19 | Z | 27.25 |
|---|---|---|---|---|---|
| α | 21.22 | β | 0.00 | γ | 0.00 |

Displacement and tilt(2)

| X | 0.00 | Y | 1.38 | Z | 42.43 |
|---|---|---|---|---|---|
| α | -8.85 | β | 0.00 | γ | 0.00 |

Displacement and tilt(3)

| X | 0.00 | Y | 21.93 | Z | 33.20 |
|---|---|---|---|---|---|
| α | 90.05 | β | 0.00 | γ | 0.00 |

Displacement and tilt(4)

| X | 0.00 | Y | 25.02 | Z | 35.56 |
|---|---|---|---|---|---|
| α | 73.13 | β | 0.00 | γ | 0.00 |

Displacement and tilt(5)

| X | 0.00 | Y | -12.00 | Z | 32.00 |
|---|---|---|---|---|---|
| α | 90.00 | β | 0.00 | γ | 0.00 |

Displacement and tilt(6)

| X | 0.00 | Y | -13.00 | Z | 36.50 |
|---|---|---|---|---|---|
| α | 90.00 | β | 0.00 | γ | 0.00 |

Numerical Example 3

| Surface No. | Radius of curvature | Surface separation | Displacement and tilt | Refractive index | Abbe's No. |
|---|---|---|---|---|---|
| Object plane | ∞ | -1000.00 | | | |
| 1 | ∞(Exit pupil) | | | | |
| 2 | FFS[1] | | (1) | 1.5254 | 56.2 |
| 3 | FFS[2] | | (2) | 1.5254 | 56.2 |
| 4 | FFS[1] | | (1) | 1.5254 | 56.2 |
| 5 | FFS[3] | | (3) | | |
| Image plane | ∞ | | (4) | | |
| 7 | FFS[3] | | (3) | 1.5254 | 56.2 |
| 8 | ∞ | | (5) | | |
| Entrance plane | ∞ | | (6) | | |

FFS[1]

| | | |
|---|---|---|
| $C_5$ $-3.0943 \times 10^{-3}$ | $C_7$ $-2.1692 \times 10^{-3}$ | $C_8$ $-4.8306 \times 10^{-5}$ |
| $C_{10}$ $-5.3490 \times 10^{-5}$ | $C_{12}$ $1.4200 \times 10^{-6}$ | $C_{14}$ $1.5139 \times 10^{-6}$ |
| $C_{16}$ $-1.0861 \times 10^{-5}$ | $C_{17}$ $1.5841 \times 10^{-7}$ | $C_{19}$ $6.9496 \times 10^{-8}$ |
| $C_{21}$ $-1.4837 \times 10^{-7}$ | | |

FFS[2]

| | | |
|---|---|---|
| $C_5$ $-7.6816 \times 10^{-3}$ | $C_7$ $-7.6146 \times 10^{-3}$ | $C_8$ $2.8189 \times 10^{-5}$ |
| $C_{10}$ $-3.8271 \times 10^{-6}$ | $C_{12}$ $-2.5770 \times 10^{-8}$ | $C_{14}$ $8.8906 \times 10^{-7}$ |
| $C_{16}$ $-2.7528 \times 10^{-6}$ | $C_{17}$ $9.4659 \times 10^{-8}$ | $C_{19}$ $8.1970 \times 10^{-8}$ |

-continued $C_{21}$ $8.5439 \times 10^{-8}$

FFS[3]

| | | |
|---|---|---|
| $C_5$ $-1.2314 \times 10^{-2}$ | $C_7$ $-1.3727 \times 10^{-2}$ | $C_8$ $-3.0807 \times 10^{-4}$ |
| $C_{10}$ $2.4329 \times 10^{-4}$ | $C_{14}$ $7.0617 \times 10^{-6}$ | $C_{16}$ $2.0688 \times 10^{-5}$ |
| $C_{17}$ $2.8361 \times 10^{-8}$ | $C_{19}$ $-1.7179 \times 10^{-6}$ | $C_{21}$ $-5.4413 \times 10^{-7}$ |

Displacement and tilt(1)

| X | 0.00 | Y | 8.88 | Z | 26.99 |
|---|---|---|---|---|---|
| α | 21.35 | β | 0.00 | γ | 0.00 |

Displacement and tilt(2)

| X | 0.00 | Y | 1.43 | Z | 42.68 |
|---|---|---|---|---|---|
| α | -9.43 | β | 0.00 | γ | 0.00 |

Displacement and tilt(3)

| X | 0.00 | Y | 21.72 | Z | 32.14 |
|---|---|---|---|---|---|
| α | 89.25 | β | 0.00 | γ | 0.00 |

Displacement and tilt(4)

| X | 0.00 | Y | 24.52 | Z | 34.04 |
|---|---|---|---|---|---|
| α | 75.94 | β | 0.00 | γ | 0.00 |

Displacement and tilt(5)

| X | 0.00 | Y | -12.00 | Z | 32.00 |
|---|---|---|---|---|---|
| α | 90.00 | β | 0.00 | γ | 0.00 |

Displacement and tilt(6)

| X | 0.00 | Y | -13.00 | Z | 36.00 |
|---|---|---|---|---|---|
| α | 90.00 | β | 0.00 | γ | 0.00 |

Numerical Example 4

| Surface No. | Radius of curvature | Surface separation | Displacement and tilt | Refractive index | Abbe's No. |
|---|---|---|---|---|---|
| Object plane | ∞ | -1000.00 | | | |
| 1 | ∞(Exit pupil) | | | | |
| 2 | 465.98 (Aspheric) | | (1) | 1.5254 | 56.2 |
| 3 | FFS[1] | | (2) | 1.5254 | 56.2 |
| 4 | 465.98 (Aspheric) | | (1) | 1.5254 | 56.2 |
| 5 | FFS[2] | | (3) | | |
| Image plane | ∞ | | (4) | | |
| Entrance pupil | ∞ | | (5) | | |

Aspherical Coefficients
Surface No.: 2, 4

P = 1
$A_4 = -3.5067 \times 10^{-6}$
$A_6 = 4.6627 \times 10^{-10}$

FFS[1]

| | | |
|---|---|---|
| $C_5$ $-5.9694 \times 10^{-3}$ | $C_7$ $-6.5778 \times 10^{-3}$ | $C_8$ $5.4922 \times 10^{-5}$ |
| $C_{10}$ $6.5817 \times 10^{-5}$ | $C_{12}$ $-2.8264 \times 10^{-6}$ | $C_{14}$ $-5.5724 \times 10^{-6}$ |
| $C_{16}$ $-1.0995 \times 10^{-6}$ | $C_{17}$ $2.0234 \times 10^{-7}$ | $C_{19}$ $9.3296 \times 10^{-6}$ |
| $C_{21}$ $1.4712 \times 10^{-7}$ | | |

FFS[2]

| | | |
|---|---|---|
| $C_5$ $-5.4431 \times 10^{-4}$ | $C_7$ $-5.9504 \times 10^{-3}$ | $C_8$ $-7.1036 \times 10^{-4}$ |
| $C_{10}$ $-3.6383 \times 10^{-4}$ | $C_{14}$ $4.4298 \times 10^{-5}$ | $C_{16}$ $-3.9713 \times 10^{-6}$ |
| $C_{19}$ $-8.8974 \times 10^{-7}$ | $C_{21}$ $-1.5926 \times 10^{-6}$ | |

Displacement and tilt(1)

| X | 0.00 | Y | 7.27 | Z | 27.85 |
|---|---|---|---|---|---|
| α | 16.12 | β | 0.00 | γ | 0.00 |

|  | Displacement and tilt(2) |  |  |  |  |
|---|---|---|---|---|---|
| X | 0.00 | Y | 0.89 | Z | 38.74 |
| α | −12.19 | β | 0.00 | γ | 0.00 |
|  | Displacement and tilt(3) |  |  |  |  |
| X | 0.00 | Y | 18.55 | Z | 33.70 |
| α | 76.51 | β | 0.00 | γ | 0.00 |
|  | Displacement and tilt(4) |  |  |  |  |
| X | 0.00 | Y | 23.92 | Z | 37.47 |
| α | 26.70 | β | 0.00 | γ | 0.00 |
|  | Displacement and tilt(5) |  |  |  |  |
| X | 0.00 | Y | 24.74 | Z | 6.23 |
| α | −34.49 | β | 0.00 | γ | 0.00 |

Numerical Example 5

| Surface No. | Radius of curvature | Surface separation | Displacement and tilt | Refractive index | Abbe's No. |
|---|---|---|---|---|---|
| Object plane | ∞ | −1000.00 |  |  |  |
| 1 | ∞(Exit pupil) |  |  |  |  |
| 2 | −94.76 (Aspheric) |  | (1) | 1.5254 | 56.2 |
| 3 | FFS[1] |  | (2) | 1.5254 | 56.2 |
| 4 | −94.76 (Aspheric) |  | (1) | 1.5254 | 56.2 |
| 5 | FFS[2] |  | (3) |  |  |
| Image plane | ∞ |  | (4) |  |  |
| 7 | FFS[2] |  | (3) | 1.5254 | 56.2 |
| 8 | −94.76 (Aspheric) |  | (1) |  |  |
| Entrance pupil | ∞ |  | (5) |  |  |

Aspherical Coefficients
Surface No.: 2, 4, 8

P = 1
$A_4 = 1.9079 \times 10^{-6}$
$A_6 = -1.8638 \times 10^{-9}$

FFS[1]

$C_5$ −1.0488 × 10⁻²  $C_7$ −1.0606 × 10⁻²  $C_8$ 4.0912 × 10⁻⁵
$C_{10}$ 1.2549 × 10⁻⁵  $C_{14}$ −2.7265 × 10⁻⁶  $C_{16}$ −1.2752 × 10⁻⁶

FFS[2]

$C_5$ −3.5995 × 10⁻²  $C_7$ 1.2635 × 10⁻²  $C_8$ 1.0591 × 10⁻³
$C_{10}$ 1.2029 × 10⁻³  $C_{14}$ 3.6330 × 10⁻⁶  $C_{16}$ −7.5845 × 10⁻⁵

|  | Displacement and tilt(1) |  |  |  |  |
|---|---|---|---|---|---|
| X | 0.00 | Y | 7.75 | Z | 27.83 |
| α | 13.48 | β | 0.00 | γ | 0.00 |
|  | Displacement and tilt(2) |  |  |  |  |
| X | 0.00 | Y | 0.47 | Z | 38.10 |
| α | −16.14 | β | 0.00 | γ | 0.00 |
|  | Displacement and tilt(3) |  |  |  |  |
| X | 0.00 | Y | 19.24 | Z | 33.85 |
| α | 63.60 | β | 0.00 | γ | 0.00 |
|  | Displacement and tilt(4) |  |  |  |  |
| X | 0.00 | Y | 22.06 | Z | 35.38 |
| α | 48.19 | β | 0.00 | γ | 0.00 |
|  | Displacement and tilt(5) |  |  |  |  |
| X | 0.00 | Y | 11.77 | Z | 25.69 |
| α | 45.00 | β | 0.00 | γ | 0.00 |

Numerical Example 6

| Surface No. | Radius of curvature | Surface separation | Displacement and tilt | Refractive index | Abbe's No. |
|---|---|---|---|---|---|
| Object plane | ∞ | −1000.00 |  |  |  |
| 1 | ∞(Exit pupil) |  |  |  |  |
| 2 | FFS[1] |  | (1) | 1.4922 | 57.5 |
| 3 | FFS[2] |  | (2) | 1.4922 | 57.5 |
| 4 | FFS[1] |  | (1) | 1.4922 | 57.5 |
| 5 | FFS[3] |  | (3) |  |  |
| Image plane | ∞ |  | (4) |  |  |
| 7 | FFS[3] |  | (3) | 1.4922 | 57.5 |
| 8 | FFS[1] |  | (5) |  |  |
| Entrance pupil | ∞ |  | (6) |  |  |

FFS[1]

$C_5$ 2.9570 × 10⁻³  $C_7$ −4.5102 × 10⁻⁴  $C_8$ −1.1841 × 10⁻⁴
$C_{10}$ −3.6536 × 10⁻⁴  $C_{12}$ 3.1647 × 10⁻⁷  $C_{14}$ −6.4774 × 10⁻⁶
$C_{16}$ 2.4952 × 10⁻⁶  $C_{17}$ −2.0353 × 10⁻⁸  $C_{19}$ −2.3030 × 10⁻⁷
$C_{21}$ 1.7734 × 10⁻⁷

FFS[2]

$C_5$ −4.7191 × 10⁻³  $C_7$ −8.3088 × 10⁻³  $C_8$ −2.0175 × 10⁻⁴
$C_{10}$ −1.9493 × 10⁻⁴  $C_{12}$ 1.2277 × 10⁻⁵  $C_{14}$ 1.3477 × 10⁻⁵
$C_{16}$ 4.0330 × 10⁻⁶  $C_{17}$ −3.9483 × 10⁻⁷  $C_{19}$ −4.2676 × 10⁻⁷
$C_{21}$ −2.4556 × 10⁻⁸

FFS[3]

$C_5$ −2.2415 × 10⁻²  $C_7$ −3.8343 × 10⁻²  $C_8$ −1.0407 × 10⁻³
$C_{10}$ −1.0232 × 10⁻³  $C_{12}$ 1.4363 × 10⁻⁴  $C_{14}$ 8.7965 × 10⁻⁵
$C_{16}$ 1.0283 × 10⁻⁴

|  | Displacement and tilt(1) |  |  |  |  |
|---|---|---|---|---|---|
| X | 0.00 | Y | 7.58 | Z | 24.19 |
| α | 12.66 | β | 0.00 | γ | 0.00 |
|  | Displacement and tilt(2) |  |  |  |  |
| X | 0.00 | Y | 0.70 | Z | 33.32 |
| α | −15.72 | β | 0.00 | γ | 0.00 |
|  | Displacement and tilt(3) |  |  |  |  |
| X | 0.00 | Y | 18.58 | Z | 29.96 |
| α | 59.81 | β | 0.00 | γ | 0.00 |
|  | Displacement and tilt(4) |  |  |  |  |
| X | 0.00 | Y | 21.74 | Z | 31.53 |
| α | 41.40 | β | 0.00 | γ | 0.00 |
|  | Displacement and tilt(5) |  |  |  |  |
| X | 0.00 | Y | −14.27 | Z | 20.71 |
| α | 54.32 | β | 0.00 | γ | 0.00 |

Figure 28:
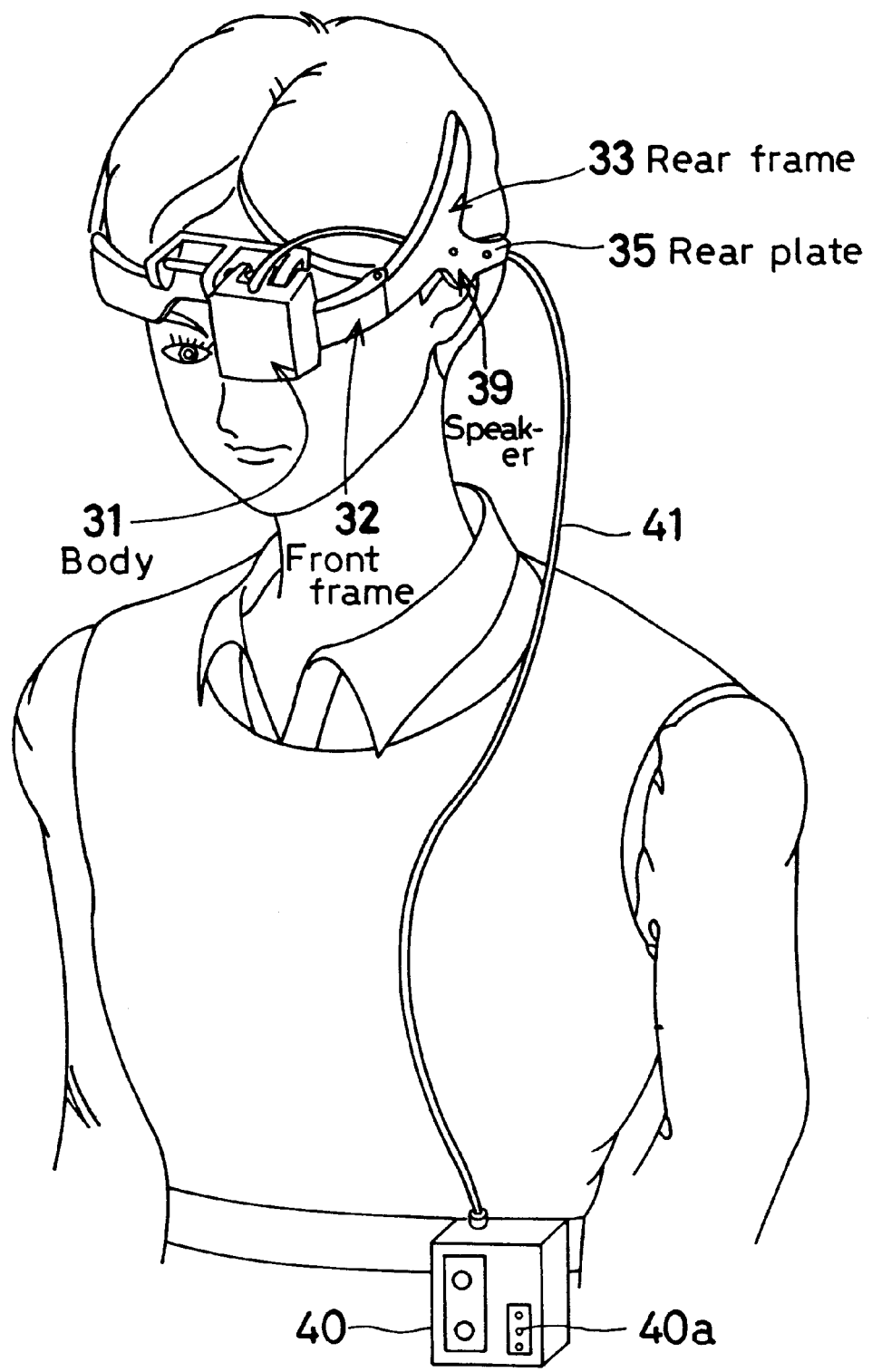
FIG. 28 is a diagram showing an arrangement in which an image display apparatus using an optical system according to the present invention is adapted to be fitted for a single eye of an observer.
Figure 29:
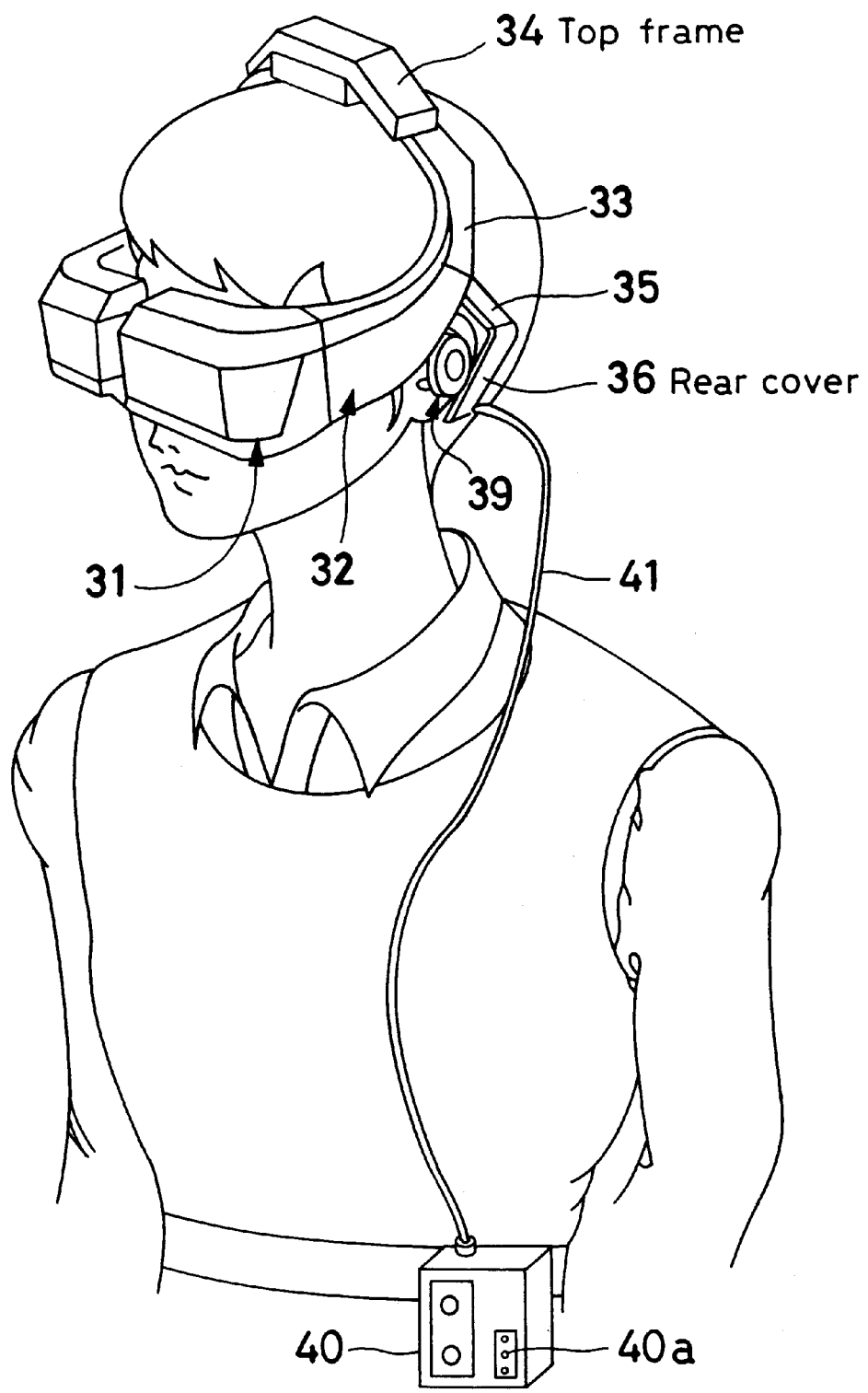
FIG. 29 is a diagram showing an arrangement in which an image display apparatus using an optical system according to the present invention is adapted to be fitted for both eyes of an observer.

The optical system according to the present invention may be applied to a head-mounted image display apparatus as follows. A head-mounted image display apparatus for a single eye can be formed by preparing a combination of an optical system, particularly a decentered prism optical system arranged as stated above, and an image display device such as a reflective LCD placed in the image plane of the optical system. It is also possible to form a head-mounted image display apparatus for two eyes by preparing a pair of such combinations of an optical system and an image display device and supporting them apart from each other by the interpupillary distance, i.e. the distance between the two eyes. Thus, it is possible to form a stationary or portable image display apparatus that enables observation with a single eye or two eyes FIG. 28 shows a head-mounted image display apparatus arranged for a single eye (in this case, the apparatus is designed for the left eye), and FIG. 29 shows a head-mounted image display apparatus arranged for two eyes. In FIGS. 28 and 29, reference numeral 31 denotes a display apparatus body unit. In the case of FIG. 28, the display apparatus body unit 31 is supported by a support member through the observer's head such that the display apparatus body unit 31 is held in front of the observer's left eye. In the case of FIG. 29, the display apparatus body unit 31 is supported by a support member through the observer's head such that the display apparatus body unit 31 is held in front of both the observer's eyes. The support member has a pair of front frames 32 (left and right) each joined at one end thereof to the display apparatus body unit 31. The left and right front frames 32 extend from the observer's temples to the upper portions of his/her ears, respectively. A pair of rear frames 33 (left and right) are joined to the other ends of the left and right front frames 32, respectively, and extend over the left and right side portions of the observer's head. In the case of FIG. 29, the support member further has a top frame 34 joined at both ends thereof to the other ends of the left and right rear frames 33, respectively, such that the top frame 34 lies over the top of the observer's head.

A rear plate 35 is joined to one front frame 32 near the joint to the rear frame 33. The rear plate 35 is formed from an elastic member, e.g. a metal leaf spring. In the case of FIG. 29, a rear cover 36, which constitutes a part of the support member, is joined to the rear plate 35 such that the rear cover 36 can support the apparatus at a position behind the observer's ear in a region extending from the back part of the head to the base of the neck. A speaker 39 is mounted inside the rear plate 35 or the rear cover 36 at a position corresponding to the observer's ear.

A cable 41 for transmitting external image and sound signals is led out from the display apparatus body unit 31. In the case of FIG. 29, the cable 41 extends through the top frame 34, the rear frames 33, the front frames 32 and the rear plate 35 and projects to the outside from the rear end of the rear cover 36. In the case of FIG. 28, the cable 41 projects from the rear end of the rear plate 35. The cable 41 is connected to a video-replaying unit 40. It should be noted that reference numeral 40a in the figures denotes a switch and volume control part of the video-replaying unit 40.

The cable 41 may have a jack and plug arrangement attached to the distal end thereof so that the cable 41 can be detachably connected to an existing video deck or the like. The cable 41 may also be connected to a TV signal receiving tuner so as to enable the user to enjoy watching TV. Alternatively, the cable 41 may be connected to a computer to receive computer graphic images or message images or the like from the computer. To eliminate the bothersome cord, the head-mounted image display apparatus may be arranged to receive external radio signals through an antenna connected thereto.

Although the optical system according to the present invention has been described by way of some examples, it should be noted that the present invention is not necessarily limited to these examples and that various changes and modifications may be imparted thereto.

As will be clear from the foregoing description, the optical system according to the present invention has a chromatic aberration producing device between the entrance pupil and the exit pupil. Therefore, even if a plurality of illuminating light sources of different colors are placed in a side-by-side relation to each other on the entrance pupil, rays from the different light sources can pass the exit pupil, being superimposed on one another, without chromatic aberration. Accordingly, in the case of an ocular optical system, for example, even if the observer's pupil position deviates from the exit pupil position, it is possible to observe a clear image, which is free from chromatic aberration. Thus, the present invention provides an optical system for an ocular optical system or a projection optical system, which makes it possible to reduce the overall size and weight of a head-mounted image display apparatus, a color film projection apparatus, etc.

What we claim is:

1. An image display apparatus comprising:
    a reflective image display device adapted to form an observation image for an observer on an image plane by reflecting light rays;
    a light source constructed and arranged to illuminate the image plane of said reflective image display device from a front side thereof;
    an image-forming optical system configured to project said image plane as a real image or a virtual image; and
    a chromatic aberration producing unit constructed and arranged to correct chromatic aberration in the real image or the virtual image, said chromatic aberration producing unit being positioned in an optical path between said light source and said reflective image display device,
    said image-forming optical system including a prism member,
    said prism member comprising:
        an entrance surface through which a bundle of light rays enters said prism member,
        a reflecting surface configured to reflect the light rays in said prism member, and
        an exit surface through which a bundle of light rays exits said prism member,
        wherein said reflecting surface corrects chromatic aberrations due to decentration and has a rotationally asymmetric curved surface configuration.

2. An image display apparatus according to claim 1, wherein said image-forming optical system is a decentered prism optical system having three optical surfaces that surround a medium having a refractive index larger than 1, an exit pupil of said image display apparatus being located to face said first surface, and said image plane being disposed to face said third surface, so that display light from an object placed in said image plane enters said decentered prism optical system through said third surface, which has a transmitting action, and is reflected by an inner side of said first surface, which faces said exit pupil and has both a reflecting action and a transmitting action, and the reflected light is incident on said second surface, which is located on an opposite side relative to said exit pupil with respect to said first surface, and is reflected by an inner side of said second surface, and the reflected light exits from said decentered prism optical system through said first surface.

3. An image display apparatus according to claim 2, wherein said chromatic aberration producing unit is arranged so that chromatic aberration is introduced into an image of said exit pupil at said light source.

4. An image display apparatus according to claim 2, wherein said chromatic aberration producing unit is arranged to introduce chromatic aberration into the real image or the virtual image of said object and an image of said exit image at said light source.

5. An image display apparatus according to claim 1, wherein said chromatic aberration producing unit is provided between said image-forming-optical system and said light source.

6. An image display apparatus according to claim 2, wherein said chromatic aberration producing unit is provided between said decentered prism optical system and said light source.

7. An image display apparatus according to claim 2, wherein said chromatic aberration producing unit is provided between said decentered prism optical system and said image plane.

8. An image display apparatus according to claim 2, wherein a plurality of said chromatic aberration producing units are provided between said exit pupil and said image plane and arranged so that chromatic aberration is introduced into an image of said exit pupil at said light source.

9. An image display apparatus according to claim 2, wherein a plurality of illuminating light sources of different colors are provided in conformity to colors of chromatic aberration at said light source.

10. An image display apparatus according to claim 2, wherein said chromatic aberration producing unit is at least one of a dispersing prism having chromatic dispersion and a plate glass having chromatic dispersion.

11. An image display apparatus according to claim 2, wherein said chromatic aberration producing unit is a diffractive optical element.

12. An image display apparatus according to claim 2, wherein said chromatic aberration producing unit is a gradient index optical element having chromatic dispersion.

13. An image display apparatus according to claim 2, wherein said chromatic aberration producing unit is at least one of a chromatic dispersion surface and a diffractive optical element provided on an optical surface of said decentered prism optical system.

14. An image display apparatus according to claim 1, wherein said chromatic aberration producing unit is arranged so that chromatic aberration is introduced into an image of said exit pupil at said light source.

15. An image display apparatus according to claim 1, wherein said chromatic aberration producing unit is arranged to introduce chromatic aberration into the real image or the virtual image of said object and an image of said exit image at said light source.

16. An image display apparatus according to claim 2, wherein said chromatic aberration producing unit is provided between said image-forming-optical system and said light source.

17. An image display apparatus according to claim 1, wherein said chromatic aberration producing unit is provided between said decentered prism optical system and said light source.

18. An image display apparatus according to claim 1, wherein said chromatic aberration producing unit is provided between said decentered prism optical system and said image plane.

19. An image display apparatus according to claim 1, wherein a plurality of said chromatic aberration producing units are provided between said exit pupil and said image plane and arranged so that chromatic aberration is introduced into an image of said exit pupil at said light source.

20. An image display apparatus according to claim 1, wherein a plurality of illuminating light sources of different colors are provided in conformity to colors of chromatic aberration at said light source.

21. An image display apparatus according to claim 1, wherein said chromatic aberration producing unit is at least one of a dispersing prism having chromatic dispersion and a plate glass having chromatic dispersion.

22. An image display apparatus according to claim 1, wherein said chromatic aberration producing unit is a diffractive optical element.

23. An image display apparatus according to claim 1, wherein said chromatic aberration producing unit is a gradient index optical element having chromatic dispersion.

24. An image display apparatus according to claim 1, wherein said chromatic aberration producing unit is at least one of a chromatic dispersion surface and a diffractive optical element provided on an optical surface of said decentered prism optical system.

* * * * *